United States Patent
Matsuo et al.

(10) Patent No.: US 10,412,062 B2
(45) Date of Patent: Sep. 10, 2019

(54) JOB EXECUTION METHOD AND JOB EXECUTION DEVICE

(71) Applicant: SCREEN HOLDINGS CO., LTD., Kyoto (JP)

(72) Inventors: Koji Matsuo, Kyoto (JP); Kazuo Isoguchi, Kyoto (JP); Sho Tomioka, Kyoto (JP); Toshio Manki, Kyoto (JP); Tetsuyuki Kitayama, Kyoto (JP); Kenta Nagai, Kyoto (JP); Kiyoshi Imai, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 244 days.

(21) Appl. No.: 15/473,344

(22) Filed: Mar. 29, 2017

(65) Prior Publication Data
US 2017/0289110 A1  Oct. 5, 2017

(30) Foreign Application Priority Data

Mar. 31, 2016  (JP) ................................. 2016-070222
Sep. 30, 2016  (JP) ................................. 2016-193068

(51) Int. Cl.
G06F 21/62   (2013.01)
H04L 29/06   (2006.01)
H04L 9/14    (2006.01)
H04L 9/08    (2006.01)
G06F 3/12    (2006.01)
G06F 21/60   (2013.01)

(52) U.S. Cl.
CPC ........ *H04L 63/0435* (2013.01); *G06F 3/1222* (2013.01); *G06F 3/1238* (2013.01); *G06F 3/1285* (2013.01); *G06F 21/608* (2013.01); *H04L 9/0861* (2013.01); *H04L 9/14* (2013.01)

(58) Field of Classification Search
CPC .................................................... H04L 63/0435
USPC ......................................................... 713/168
See application file for complete search history.

(56) References Cited

U.S. PATENT DOCUMENTS 5,321,749 A * 6/1994 Virga ....................... G09C 5/00
                                                      283/73
7,143,289 B2 * 11/2006 Denning ................. G06F 21/10
                                                      713/168

(Continued)

FOREIGN PATENT DOCUMENTS

JP  2009-193118 A  8/2009

*Primary Examiner* — Dant B Shaifer Harriman
(74) *Attorney, Agent, or Firm* — McDermott Will & Emery LLP

(57) ABSTRACT

An editing device generates a first public key and a first private key, receives a manuscript data encrypted using the first public key from an ordering device, and decrypts the encrypted manuscript data using the first private key. The editing device generates, based on the manuscript data, print data encrypted using a second public key generated in a RIP processing device, and deletes the first private key after finishing execution of a job. Using a third public key, the editing device encrypts a log which shows an execution process of the job, the log including information that a finish processing has been executed. The editing device may store the first private key before starting execution of the job, and may control whether the job is to be executed, based on a job ID received from the ordering device.

11 Claims, 20 Drawing Sheets

(56) References Cited

U.S. PATENT DOCUMENTS

| | | | |
|---|---|---|---|
| 8,751,800 B1 * | 6/2014 | Dorwin | H04L 47/801 |
| | | | 713/167 |
| 9,712,503 B1 * | 7/2017 | Ahmed | H04L 63/0435 |
| 2009/0201526 A1 | 8/2009 | Kikuyama | |
| 2014/0122885 A1 * | 5/2014 | Wu | H04L 29/06 |
| | | | 713/171 |
| 2016/0248785 A1 * | 8/2016 | Petry | H04L 63/10 |

* cited by examiner

| JOB ID | STATUS | NUMBER OF PRINTING |
|---|---|---|
| 18510EE290279382C7B50190CDABEB3A | FINISHED | 5 |
| DCCDC03E718EC95203F576F9F4CA1494 | PRINTING | 3 |
| DCCDC03E718EC95203F576F9F4CA1494 | WAITING | 0 |

JOB EXECUTION METHOD AND JOB EXECUTION DEVICE

CROSS REFERENCE

This patent application claims the benefit of Japanese Patent Application Nos. 2016-070222, filed on Mar. 31, 2016 and 2016-193068, filed on Sep. 30, 2016, the entire contents of each are hereby incorporated by reference.

BACKGROUND OF THE INVENTION

Field of the Invention

The present invention relates to a job execution method and a job execution device for executing an instructed job, and a recording medium on which a job execution program is recorded. The present invention is applicable to a print system which executes a print job, for example.

Description of Related Art

In a printing company, printing is performed using a printing machine in accordance with an order from an orderer. In recent years, a print system using computers and networks is used to effectively perform processing from ordering to printing. FIG. 21 is a diagram showing data flow in a print system. As shown in FIG. 21, an editing device 320, a RIP (Raster Image Processing) processing device 330, and a printing machine 340 are placed in a printing company. An orderer (not shown) sends manuscript data MD to the printing company using an ordering device 310. The editing device 320 generates print data PD based on the received manuscript data MD. The RIP processing device 330 converts the generated print data PD to data processable by the printing machine 340 (hereinafter referred to as RIP-processed data RD). The printing machine 340 performs printing based on the RIP-processed data RD.

In the editing device 320 and the RIP processing device 330, an order from the orderer is processed as a print job. A job file described using a job description language is used to represent the contents of the print job. The job file is generated when a print order is received, and the editing device 320 and the RIP processing device 330 operate referring to the job file.

By the way, some print orders require that printing should be done in a high security state. For example, there is known a method for attaching, to a product, a product label (see FIG. 22) on which a special symbol called a security code (or a security mark) is printed, or using a product package on which the security code is printed, in order to prevent unauthorized manufacturing of the product and to determine authenticity of the product. When the orderer orders printing of the security code, the orderer instructs a number of the security code to be printed. In the printing company, the security code is printed obeying the instructed number.

Note that in relation to the present application, Japanese Laid-Open Patent Publication No. 2009-193118 discloses an information processing device and a printing machine which send document data from an application to a printer driver and send print data from the printer driver to a printing machine in an encrypted state using a public key and a private key, in order to prevent leakage of the document data in a print process.

When the security code is printed in a conventional print system, the orderer cannot check whether printing is performed appropriately. For example, the orderer cannot check whether the instructed number of printing is obeyed. Moreover, some conventional print systems encrypt data generated in the printing company, but no conventional print systems encrypt data generated outside the printing company. Therefore, the manuscript data or the print data of the security code may be copied in sending these data to the printing company or inside the printing company, and may flow out unauthorizedly.

The orderer may handle this problem by dispatching people for watching status of the printing in the printing company. However, there is a case in which the watcher cannot be dispatched, or a case in which an efficient watching cannot be performed even if the watchers are dispatched. Moreover, if the manuscript data or the print data of the security code remains in the print system after finishing the printing, the remaining data may flow out unauthorizedly.

SUMMARY OF THE INVENTION

Therefore, an object of the present invention is to provide a job execution method, a job execution device, and a recording medium on which a job execution program is recorded which enable to prevent unauthorized use of data generated in execution of a job and with which an execution process of the job can be traced correctly.

In order to achieve the above object, the present invention has the following features.

According to a first aspect of the present invention, there is provided a job execution method for generating second data based on first data, the method including: a key generation step for generating a public key and a private key which are necessary for encryption communication of the first data; a communication step for sending the public key and receiving encrypted first data; a data decryption step for decrypting the encrypted first data received in the communication step; a data processing step for generating the second data based on the first data obtained in the data decryption step; a finish processing step for deleting at least the private key after finishing execution of a job; and a log encryption step for encrypting, using a public log key, a log which shows an execution process of the job, the log including information that the finish processing step has been executed.

According to a second aspect of the present invention, in the first aspect of the present invention, in the communication step, the first data encrypted using the public key is received, and in the data decryption step, the encrypted first data received in the communication step is decrypted using the private key.

According to a third aspect of the present invention, in the first aspect of the present invention, in the communication step, the first data encrypted using a common key is received, in the data decryption step, the encrypted first data received in the communication step is decrypted using the common key, and in the finish processing step, the common key is deleted after finishing execution of the job.

According to a fourth aspect of the present invention, in the second aspect of the present invention, the first data is data representing a material included in a printed matter, and the second data is data obtained by encrypting data representing a page of the printed matter.

According to a fifth aspect of the present invention, in the second aspect of the present invention, the first data is data representing a page of a printed matter, and the second data is data processable by a printing machine.

According to a sixth aspect of the present invention, in the first aspect of the present invention, the second data is data obtained by encrypting third data, the third data being based on the first data, and the method further including: a second key generation step for generating a second public key and a second private key which are necessary for encryption communication of the third data; a second communication step for sending the second public key to the communication step and receiving the second data from the communication step; a second data decryption step for obtaining the third data by decrypting the second data received in the second communication step; a second data processing step for generating fourth data based on the third data obtained in the second data decryption step; a second finish processing step for deleting at least the second private key after finishing execution of the job; and a second log encryption step for encrypting, using the public log key, a second log which shows the execution process of the job, the second log including information that the second finish processing step has been executed.

According to a seventh aspect of the present invention, in the sixth aspect of the present invention, in the communication step, the first data encrypted using the public key is received, in the data decryption step, the encrypted first data received in the communication step is decrypted using the private key, in the data processing step, the second data is generated by encrypting using the second public key, and in the second data decryption step, the second data received in the second communication step is decrypted using the second private key.

According to an eighth aspect of the present invention, in the sixth aspect of the present invention, in the communication step, the first data encrypted using a common key is received, in the data decryption step, the encrypted first data received in the communication step is decrypted using the common key, in the data processing step, the second data is generated by encrypting using the common key, in the second data decryption step, the second data received in the second communication step is decrypted using the common key, and in the finish processing step and the second finish processing step, the common key is deleted after finishing execution of the job.

According to a ninth aspect of the present invention, in the seventh aspect of the present invention, the first data is data representing a material included in a printed matter, the second data is data obtained by encrypting data representing a page of the printed matter, and the fourth data is data processable by a printing machine.

According to a tenth aspect of the present invention, there is provided a job execution method for generating second data based on first data, the method including: a key storage step for storing a private key which is necessary for encryption communication of the first data, before starting execution of a job; a communication step for receiving a job ID and encrypted first data; a job control step for controlling whether the job is to be executed, based on the job ID received in the communication step; a data decryption step for decrypting the encrypted first data received in the communication step; a data processing step for generating the second data based on the first data obtained in the data decryption step; and a log encryption step for encrypting, using a public log key, a log which shows an execution process of the job.

According to an eleventh aspect of the present invention, in the tenth aspect of the present invention, in the communication step, the first data encrypted using a public key which makes a pair with the private key is received, and in the data decryption step, the encrypted first data received in the communication step is decrypted using the private key.

According to a twelfth aspect of the present invention, in the tenth aspect of the present invention, in the communication step, the first data encrypted using a common key is received, in the data decryption step, the encrypted first data received in the communication step is decrypted using the common key, and the common key is deleted after finishing execution of the job.

According to a thirteenth aspect of the present invention, in the eleventh aspect of the present invention, the first data is data representing a material included in a printed matter, and the second data is data obtained by encrypting data representing a page of the printed matter.

According to a fourteenth aspect of the present invention, in the eleventh aspect of the present invention, the first data is data representing a page of a printed matter, and the second data is data processable by a printing machine.

According to a fifteenth aspect of the present invention, in the tenth aspect of the present invention, the second data is data obtained by encrypting third data, the third data being based on the first data, and the method further including: a second key storage step for storing a second private key which is necessary for encryption communication of the third data, before starting execution of the job; a second communication step for receiving the job ID and the second data from the communication step; a second job control step for controlling whether the job is to be executed, based on the job ID received in the second communication step; a second data decryption step for obtaining the third data by decrypting the second data received in the second communication step; a second data processing step for generating fourth data based on the third data obtained in the second data decryption step; and a second log encryption step for encrypting, using the public log key, a second log which shows the execution process of the job.

According to a sixteenth aspect of the present invention, in the fifteenth aspect of the present invention, in the communication step, the first data encrypted using a public key which makes a pair with the private key is received, in the data decryption step, the encrypted first data received in the communication step is decrypted using the private key, in the data processing step, the second data is generated by encrypting using a second public key which makes a pair with the second private key, and in the second data decryption step, the second data received in the second communication step is decrypted using the second private key.

According to a seventeenth aspect of the present invention, in the fifteenth aspect of the present invention, in the communication step, the first data encrypted using a common key is received, in the data decryption step, the encrypted first data received in the communication step is decrypted using the common key, in the data processing step, the second data is generated by encrypting using the common key, in the second data decryption step, the second data received in the second communication step is decrypted using the common key, and the common key is deleted after finishing execution of the job.

According to an eighteenth aspect of the present invention, in the sixteenth aspect of the present invention, the first data is data representing a material included in a printed matter, the second data is data obtained by encrypting data representing a page of the printed matter, and the fourth data is data processable by a printing machine.

According to a nineteenth aspect of the present invention, there is provided a job execution device for generating second data based on first data, the device including: a key storage unit configured to store a private key which is necessary for encryption communication of the first data, before starting execution of a job; a communication unit configured to receive a job ID and encrypted first data; a job control unit configured to control whether the job is to be executed, based on the job ID received by the communication unit; a data decryption unit configured to decrypt the encrypted first data received by the communication unit; a data processing unit configured to generate the second data based on the first data obtained by the data decryption unit; and a log encryption unit configured to encrypt, using a public log key, a log which shows an execution process of the job.

According to the first aspect of the present invention, it is possible to prevent unauthorized use of data generated in execution of the job, by receiving the first data by the encryption communication and deleting the private key after finishing execution of the job. Moreover, it is possible to prevent altering of the log and correctly trace the execution process of the job, by encrypting the log using the public log key.

According to the second aspect of the present invention, it is possible to prevent unauthorized flow out of the first data in receiving, by receiving the first data using a public key encryption scheme.

According to the third aspect of the present invention, it is possible to prevent unauthorized flow out of the first data in receiving, by receiving the first data using both the public key encryption scheme and a common key encryption scheme. Moreover, by encrypting and decrypting using the common key, it is possible to perform these processing at high speed.

According to the fourth aspect of the present invention, when generating the data representing the page of the printed matter (print data) based on the data representing the material included in the printed matter (manuscript data), it is possible to prevent unauthorized use of data generated in the execution of the job and correctly trace the execution process of the job.

According to the fifth aspect of the present invention, when generating the data processable by the printing machine based on the print data, it is possible to prevent unauthorized use of data generated in the execution of the job and correctly trace the execution process of the job.

According to the sixth aspect of the present invention, it is possible to prevent unauthorized use of data generated in execution of the job, by sending and receiving the first data and the second data by the encryption communication and deleting the private key and the second private key after finishing the execution of the job. Moreover, it is possible to prevent altering of the log and correctly trace the execution process of the job, by encrypting the log and the second log using the public log key.

According to the seventh aspect of the present invention, it is possible to prevent unauthorized flow out of the first data and the second data in sending and receiving, by receiving the first data and sending and receiving the second data using the public key encryption scheme.

According to the eighth aspect of the present invention, it is possible to prevent unauthorized flow out of the first data and the second data in sending and receiving, by receiving the first data and sending and receiving the second data using both the public key encryption scheme and the common key encryption scheme. Moreover, by encrypting and decrypting using the common key, it is possible to perform these processing at high speed.

According to the ninth aspect of the present invention, when generating the print data based on the manuscript data and generating the data processable by the printing machine based on the print data, it is possible to prevent unauthorized use of data generated in the execution of the job. Moreover, it is possible to prevent altering of the log and correctly trace the execution process of the job, by encrypting the log using the public log key.

According to the tenth aspect of the present invention, it is possible to prevent unauthorized use of data generated in the execution of the job, by receiving the first data by the encryption communication and controlling, based on the job ID, whether the job is to be executed. Moreover, it is possible to prevent altering of the log and correctly trace the execution process of the job, by encrypting the log using the public log key.

According to the fifteenth aspect of the present invention, it is possible to prevent unauthorized use of data generated in the execution of the job, by sending and receiving the first data and the second data by the encryption communication and controlling, based on the job ID, whether the job is to be executed. Moreover, it is possible to prevent altering of the log and correctly trace the execution process of the job, by encrypting the log and the second log using the public log key.

According to the eleventh to fourteenth and sixteenth to nineteenth aspects of the present invention, effects similar to those attained by the second to fifth and seventh to tenth aspects of the present invention can be attained, respectively.

These and other objects, features, modes, and effects of the present invention will become more apparent from the following detailed description with reference to the attached drawings.

BRIEF DESCRIPTION OF THE DRAWINGS

FIG. 13 is a diagram showing contents of a job database included in the print system shown in FIG. 12;

DETAILED DESCRIPTION OF THE INVENTION

Figure 1:
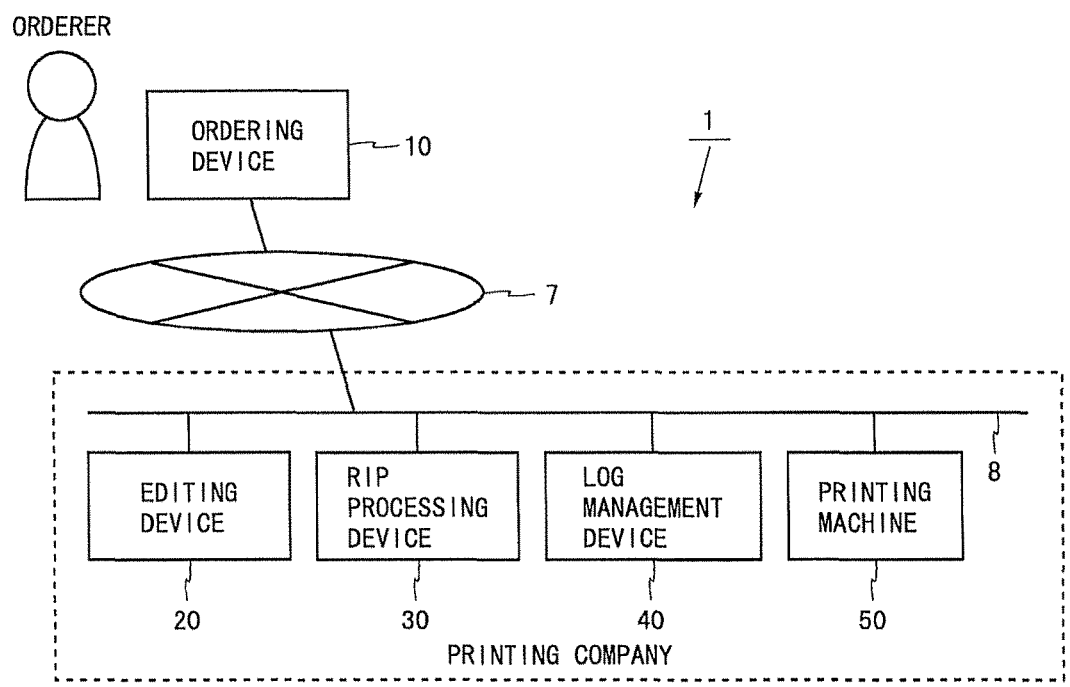
FIG. 1 is a block diagram showing a configuration of a print system according to a first embodiment of the present invention.

Hereinafter, a job execution method, a job execution device, and a recording medium on which a job execution program is recorded according to each embodiment of the present invention will be described referring to the drawings. The job execution method according to the embodiment is typically performed by using a computer. The recording medium on which the job execution program is recorded according to the embodiment is a recording medium on which a program for performing the job execution method using the computer is recorded. The job execution device according to the embodiment is typically constituted by using a computer. The computer which executes the job execution program functions as a job execution device.

In the following description, it is assumed that the job is a print job in which printing is performed in a high security state based on a manuscript data received from an ordering device. The manuscript data is an image data of a security code, for example. It is possible to prevent fake of a product and determine authenticity of the product by attaching, to the product, a product label on which the security code is printed or using a product package on which the security code is printed.

(First Embodiment)

FIG. 1 is a block diagram showing a configuration of a print system according to a first embodiment of the present invention. A print system 1 shown in FIG. 1 includes an ordering device 10, an editing device 20, a RIP processing device 30, a log management device 40, and a printing machine 50. The ordering device 10 is placed at a location of an orderer who orders printing. The editing device 20, the RIP processing device 30, the log management device 40, and the printing machine 50 are placed in a printing company and are connected to a local area network 8 in the printing company. The ordering device 10 is connected to the editing device 20 and the log management device 40 so as to communicate with these devices using a wide area network 7 such as the Internet.

Figure 2:
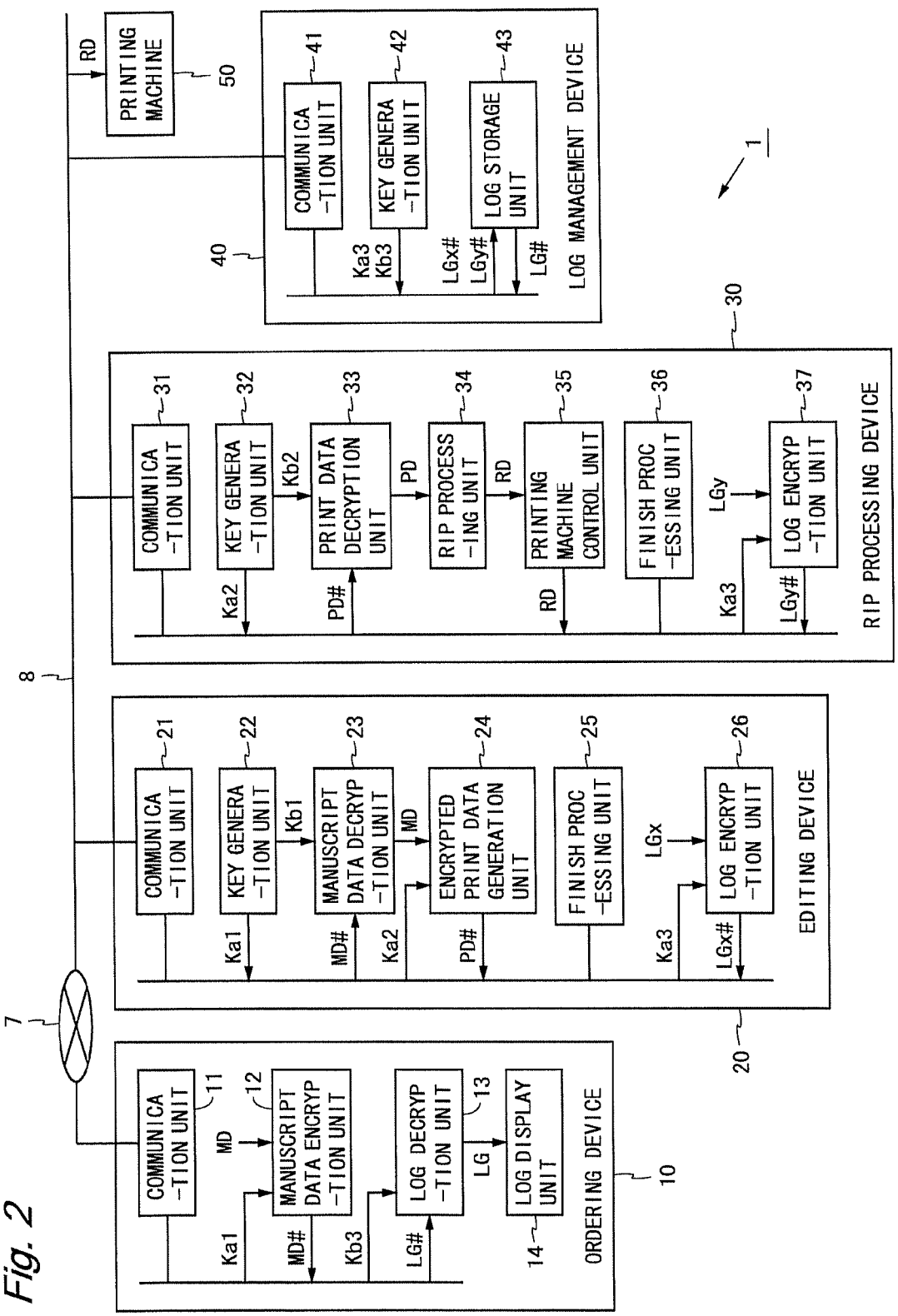
FIG. 2 is a block diagram showing details of the print system shown in FIG. 1.

FIG. 2 is a block diagram showing details of the print system 1. The ordering device 10 includes a communication unit 11, a manuscript data encryption unit 12, a log decryption unit 13, and a log display unit 14. The editing device 20 includes a communication unit 21, a key generation unit 22, a manuscript data decryption unit 23, an encrypted print data generation unit 24, a finish processing unit 25, and a log encryption unit 26. The RIP processing device 30 includes a communication unit 31, a key generation unit 32, a print data decryption unit 33, a RIP processing unit 34, a printing machine control unit 35, a finish processing unit 36, and a log encryption unit 37. The log management device 40 includes a communication unit 41, a key generation unit 42, and a log storage unit 43. Hereinafter, the symbol # represents that data or a key is encrypted.

The ordering device 10 sends manuscript data MD to the editing device 20. The editing device 20 generates print data PD based on the manuscript data MD. The editing device 20 sends the print data PD to the RIP processing device 30. The RIP processing device 30 generates RIP-processed data RD based on the print data PD. The RIP processing device 30 outputs the RIP-processed data RD to the printing machine 50. Communication using a public key encryption scheme is performed in sending the manuscript data MD from the ordering device 10 to the editing device 20 and sending the print data PD from the editing device 20 to the RIP processing device 30. RSA (Rivest-Shamir-Adleman) encryption is used for encrypting the manuscript data MD and the print data PD, for example.

The manuscript data MD is data representing a material included in a printed matter which should be printed in a high security state. The contents and the format of the manuscript data MD are arbitrary. The manuscript data MD may be an image data of a security code, for example. The print data PD is data generated based on the manuscript data MD and representing a page of the printed matter. The format of the print data PD is arbitrary. The print data PD may have a PDF (Portable Document Format) format or a vector format, for example.

The editing device 20 and the RIP processing device 30 generate logs LGx, LGy which show an execution process of printing and write the logs to the log storage unit 43 in the log management device 40. After finishing the printing, the ordering device 10 reads the log LG from the log storage unit 43 and displays the read log LG to a screen. The log LG is written to the log storage unit 43 in a state encrypted using the public key encryption scheme. The RSA encryption is used for encrypting the log LG, for example.

In the print system 1, three public keys and three private keys each of which makes a pair with one of the public keys are used. Hereinafter, the former keys are referred to as first to third public keys Ka1 to Ka3, and the latter keys are referred to as first to third private keys Kb1 to Kb3. The first public key Ka1 and the first private key Kb1 are used for encrypting and decrypting the manuscript data MD, respectively. The second public key Ka2 and the second private key Kb2 are used for encrypting and decrypting the print data PD, respectively. The third public key Ka3 and the third private key Kb3 are used for encrypting and decrypting the log LG, respectively.

The communication units 11, 21, 31, 41 send and receive data and keys among the ordering device 10, the editing device 20, the RIP processing device 30, and the log management device 40. The key generation unit 22 generates the first public key Ka1 and the first private key Kb1. The first public key Ka1 is sent from the editing device 20 to the ordering device 10. The first private key Kb1 is retained in a secret state in the editing device 20. The key generation unit 32 generates the second public key Ka2 and the second private key Kb2. The second public key Ka2 is sent from the RIP processing device 30 to the editing device 20. The second private key Kb2 is retained in a secret state in the RIP processing device 30. The key generation unit 42 generates the third public key Ka3 and the third private key Kb3. The third public key Ka3 is sent from the log management device 40 to the editing device 20 and the RIP processing device 30, and is retained in a secret state in the editing device 20 and the RIP processing device 30. The third private key Kb3 is sent from the log management device 40 to the ordering device 10 via the editing device 20.

The manuscript data encryption unit 12 encrypts, using the first public key Ka1, the manuscript data MD managed in a secret state by the ordering device 10. The manuscript data decryption unit 23 decrypts, using the first private key Kb1, encrypted manuscript data MD# received from the ordering device 10. The encrypted print data generation unit 24 generates, using the second public key Ka2, encrypted print data PD# based on the manuscript data MD obtained by the manuscript data decryption unit 23. The encrypted print data generation unit 24 starts processing immediately after the manuscript data decryption unit 23 finishes processing, and deletes the manuscript data MD obtained by the manuscript data decryption unit 23 after generating the encrypted print data PD#. The print data decryption unit 33 decrypts, using the second private key Kb2, the encrypted print data PD# received from the editing device 20. The RIP processing unit 34 performs a RIP processing to the print data PD obtained by the print data decryption unit 33, and thus obtains the RIP-processed data RD. The RIP processing unit 34 deletes the print data PD obtained by the print data decryption unit 33, after obtaining the RIP-processed data RD. The printing machine control unit 35 outputs the RIP-processed data RD to the printing machine 50, and controls the printing machine 50 to perform printing.

The log encryption unit 26 encrypts, using the third public key Ka3, the log LGx which shows an execution process of printing in the editing device 20. Encrypted log LGx# obtained by the log encryption unit 26 is sent from the editing device 20 to the log management device 40 and is written to the log storage unit 43. The log encryption unit 37 encrypts, using the third public key Ka3, the log LGy which shows the execution process of the printing in the RIP processing device 30. Encrypted log LGy# obtained by the log encryption unit 37 is sent from the RIP processing device 30 to the log management device 40 and is written to the log storage unit 43. The logs LGx, LGy must be generated when finishing the printing. The logs LGx, LGy may be generated at the start of the printing or at an arbitrary timing during the printing. The logs LGx, LGy include information that the encrypted print data PD# has been generated, information that the RIP-processed data RD has been generated, a number of printing, for example.

The finish processing units 25, 36 and the log decryption unit 13 operate after finishing the printing. The finish processing unit 25 deletes at least the first private key Kb1 after finishing the printing. It is preferable to delete the first public key Ka1, the second public key Ka2, the encrypted manuscript data MD#, and the encrypted print data PD#, but it is not mandatory to do so. The finish processing unit 36 deletes at least the second private key Kb2 and the RIP-processed data RD after finishing the printing. It is preferable to delete the second public key Ka2 and the encrypted print data PD#, but it is not mandatory to do so.

The log encryption unit 26 encrypts, using the third public key Ka3, the log LGx which shows that the encrypted print data PD# has been generated, the finish processing unit 25 has been operated (that is, data and keys which cause unauthorized use have been deleted in the editing device 20), and the like. The log encryption unit 37 encrypts, using the third public key Ka3, the log LGy which shows that the RIP-processed data RD has been generated, the number of printing, the finish processing unit 36 has been operated (that is, data and keys which cause unauthorized use have been deleted in the RIP processing device 30), and the like. The log decryption unit 13 decrypts, using the third private key Kb3, the encrypted log LG# read from the log management device 40. The log display unit 14 displays, to the screen, the log LG obtained by the log decryption unit 13.

Each of the ordering device 10, the editing device 20, the RIP processing device 30, and the log management device 40 is typically implemented by a computer which executes a program. The ordering device 10 is implemented by a computer which executes an ordering program. The editing device 20 is implemented by a computer which executes an editing program. The RIP processing device 30 is implemented by a computer which executes a RIP processing program. The log management device 40 is implemented by a computer which executes a log management program.

Figure 3:
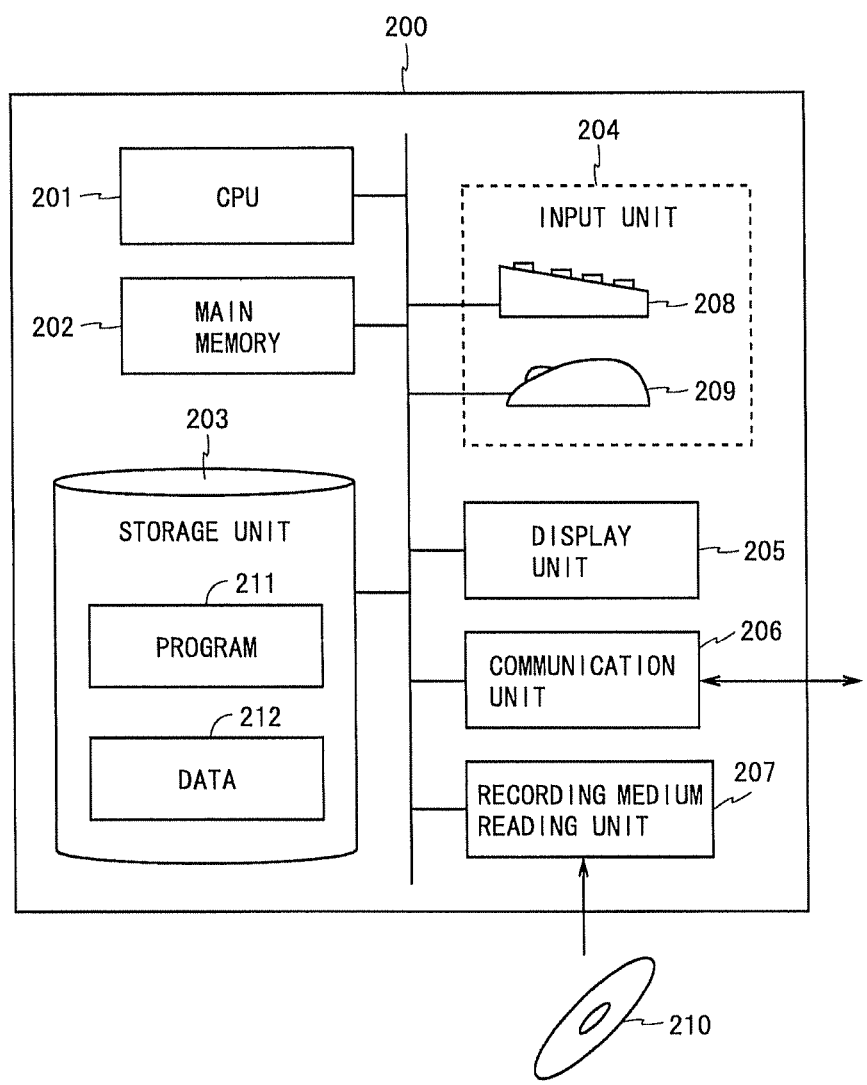
FIG. 3 is a block diagram showing a configuration of a computer which functions as one of four devices included in the print system shown in FIG. 1.

FIG. 3 is a block diagram showing a configuration of a computer which functions as one of the ordering device 10, the editing device 20, the RIP processing device 30, and the log management device 40. A computer 200 shown in FIG. 3 includes a CPU 201, a main memory 202, a storage unit 203, an input unit 204, a display unit 205, a communication unit 206, and a recording medium reading unit 207. A DRAM is used as the main memory 202, for example. A hard disk or a solid state drive is used as the storage unit 203, for example. The input unit 204 includes a keyboard 208 and a mouse 209, for example. A liquid crystal display is used as the display unit 205, for example. The communication unit 206 is an interface circuit of wired communication or radio communication. The recording medium reading unit 207 is an interface circuit of a recording medium 210 which stores a program, and the like. As the recording medium 210, a non-stationary recording medium, such as a CD-ROM, a DVD-ROM is used, for example.

When the computer 200 executes a program 211, the storage unit 203 stores the program 211 and data 212 which is a processing target of the program 211. The program 211 may be received from a server or other computers using the communication unit 206, or may be read from the recording medium 210 using the recording medium reading unit 207, for example. The data 212 may be received from the server or other computers using the communication unit 206, may be read from the recording medium 210 using the recording medium reading unit 207, or may be input by a user of the computer 200 using the input unit 204.

When the program 211 is to be executed, the program 211 and the data 212 are copied and transferred to the main memory 202. The CPU 201 processes the data 212 stored in the main memory 202 by executing the program 211 stored in the main memory 202, using the main memory 202 as a working memory. The computer 200 functions as the ordering device 10, the editing device 20, the RIP processing device 30, or the log management device 40 at this time. Note that the above-described configuration of the computer 200 is merely an example. It is possible to constitute the ordering device 10, the editing device 20, the RIP processing device 30, and the log management device 40 using any computer.

Figure 4:
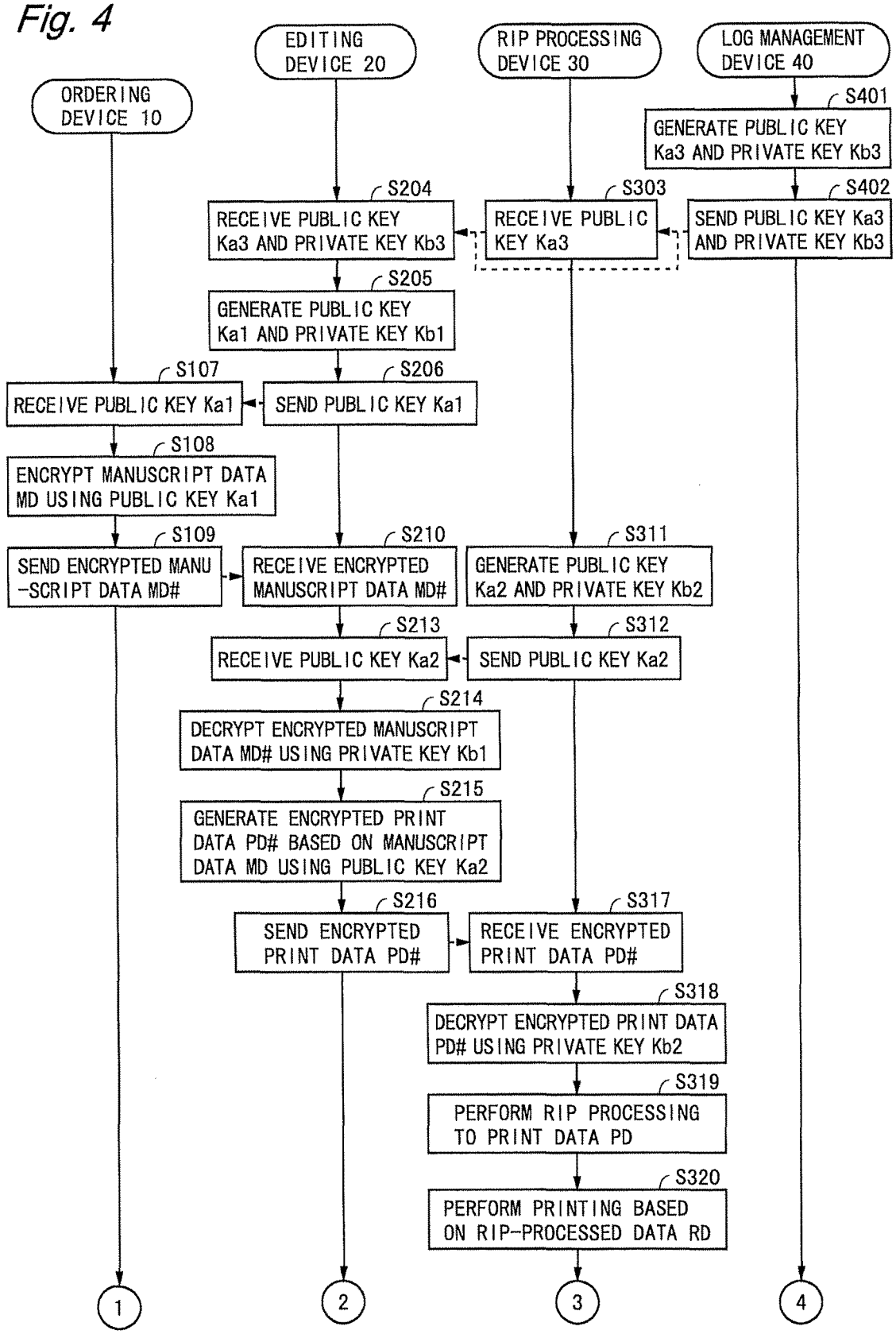
FIG. 4 is a flowchart showing operations of four computers which function as the four devices included in the print system shown in FIG. 1.
Figure 5:
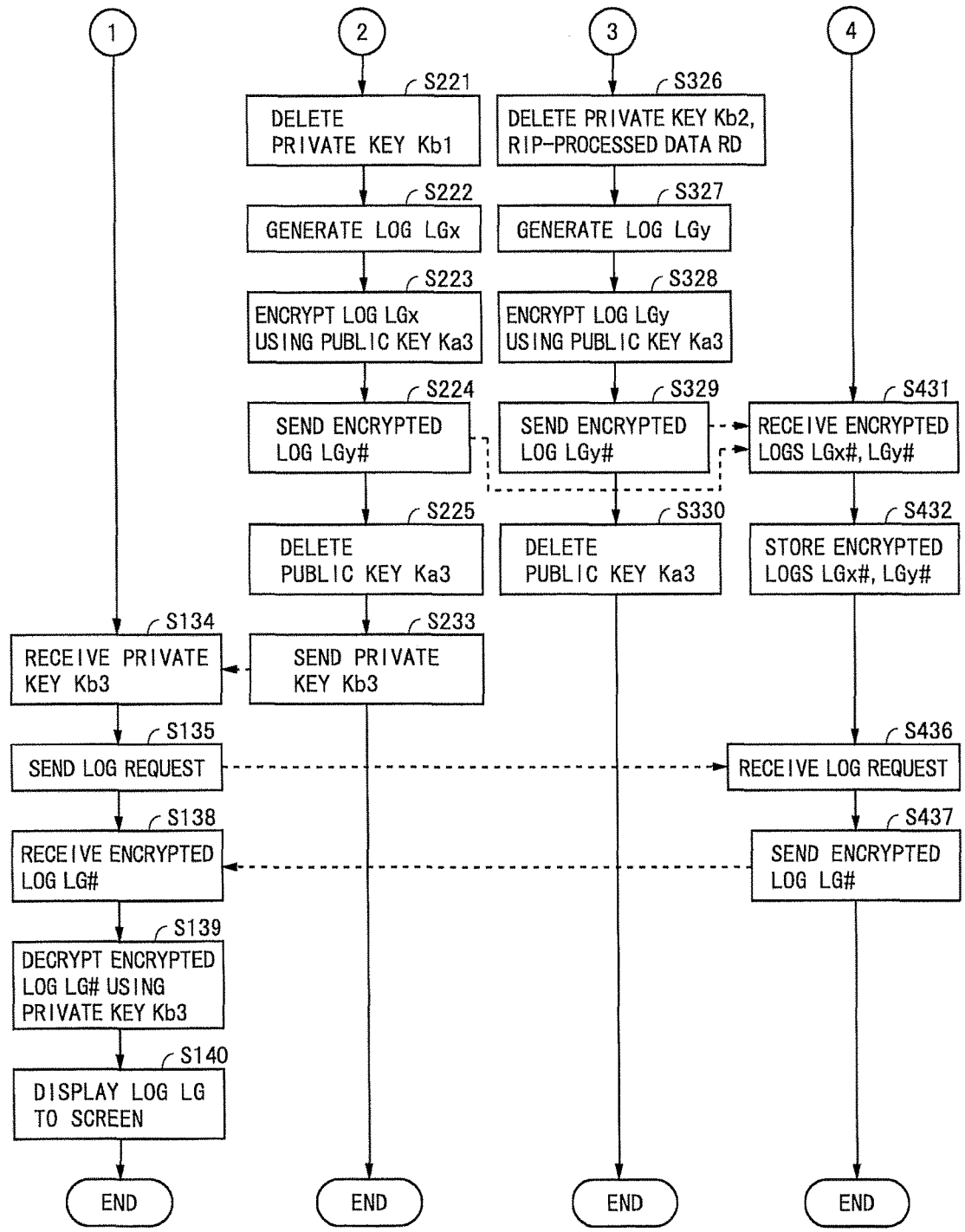
FIG. 5 is a flowchart continued from FIG. 4.

FIGS. 4 and 5 are flowcharts showing operations of four computers which function as the ordering device 10, the editing device 20, the RIP processing device 30, and the log management device 40. Hereinafter, CPUs in four computers which function as the ordering device, the editing device, the RIP processing device, and the log management device are referred to as first to fourth CPUs, respectively. In the following description, "a CPU sends or receives" means that the CPU 201 sends or receives by controlling the communication unit 206.

In FIG. 4, the fourth CPU generates the third public key Ka3 and the third private key Kb3 (step S401). Next, the fourth CPU sends the third public key Ka3 and the third private key Kb3 to the editing device 20 and the RIP processing device 30 (step S402). The third CPU receives the third public key Ka3 from the log management device 40 (step S303). The second CPU receives the third public key Ka3 and the third private key Kb3 from the log management device 40 (step S204).

After executing step S204, the second CPU generates the log LGx which shows the execution process of the printing in the editing device 20, and sends the log LGx# encrypted using the third public key Ka3 to the log management device 40. After executing step S303, the third CPU generates the log LGy which shows the execution process of the printing in the RIP processing device 30, and sends the log LGy# encrypted using the third public key Ka3 to the log management device 40. The fourth CPU receives the encrypted logs LGx#, LGy# from the editing device 20 and the RIP processing device 30 and writes the logs to the log storage unit 43. These processing are performed at the start of the printing and at an arbitrary timing during the printing, thus their descriptions are omitted in the flowcharts and explanation thereof.

Next, the second CPU generates the first public key Ka1 and the first private key Kb1 (step S205). Next, the second CPU sends the first public key Ka1 to the ordering device 10 (step S206). The first CPU receives the first public key Ka1 from the editing device 20 (step S107). Next, the first CPU encrypts the manuscript data MD using the first public key Ka1 (step S108). Next, the first CPU sends the encrypted manuscript data MD# to the editing device 20 (step S109). The second CPU receives the encrypted manuscript data MD# from the ordering device 10 (step S210).

The third CPU generates the second public key Ka2 and the second private key Kb2 (step S311). Next, the third CPU sends the second public key Ka2 to the editing device 20 (step S312). The second CPU receives the second public key Ka2 from the RIP processing device 30 (step S213). Next, the second CPU decrypts the encrypted manuscript data MD# received in step S210, using the first private key Kb1 generated in step S205 (step S214). The manuscript data MD obtained in step S214 is stored in the main memory 202, but is not stored in the storage unit 203.

Next, the second CPU generates the encrypted print data PD# based on the manuscript data MD, using the second public key Ka2 received in step S213 (step S215). In step S215, the second CPU performs a processing of generating the print data PD based on the manuscript data MD and a processing of encrypting the generated print data PD using the second public key Ka2 together and inseparably. The print data PD which is intermediate data is stored in the main memory 202, but is not stored in the storage unit 203. In step S215, the second CPU releases storage area of the manuscript data MD and the print data PD in the main memory 202 after generating the encrypted print data PD#. Thus, the manuscript data MD and the print data PD are deleted in step S215.

Next, the second CPU sends the encrypted print data PD# to the RIP processing device 30 (step S216). The third CPU receives the encrypted print data PD# from the editing device 20 (step S317). Next, the third CPU decrypts the encrypted print data PD#, using the second private key Kb2 generated in step S311 (step S318). Next, the third CPU performs the RIP processing to the print data PD, and thus obtains the RIP-processed data RD (step S319). In step S319, the third CPU deletes the print data PD after obtaining the RIP-processed data RD. Next, the third CPU performs printing based on the RIP-processed data RD (step S320). In step S320, the RIP-processed data RD is output from the RIP processing device 30 to the printing machine 50, and the printing machine 50 performs printing based on the RIP-processed data RD.

In FIG. 5, the second CPU deletes the first private key Kb1 generated in step S205 (step S221). Next, the second CPU generates the log LGx which shows that the encrypted print data PD# has been generated, that step S221 has been executed (at least the first private key Kb1 has been deleted), and the like (step S222). Next, the second CPU encrypts the log LGx using the third public key Ka3 received in step S204 (step S223). Next, the second CPU sends the encrypted log LGx# to the log management device 40 (step S224). Next, the second CPU deletes the third public key Ka3 (step S225).

The third CPU deletes the second private key Kb2 generated in step S311 and the RIP-processed data RD generated in step S319 (step S326). Next, the third CPU generates the log LGy which shows that the RIP-processed data RD has been generated, the number of printing, that step S326 has been executed (at least the second private key Kb2 has been deleted), and the like (step S327). Next, the third CPU encrypts the log LGy using the third public key Ka3 received in step S303 (step S328). Next, the third CPU sends the encrypted log LGy# to the log management device 40 (step S329). Next, the third CPU deletes the third public key Ka3 (step S330).

The fourth CPU receives the encrypted log LGx# from the editing device 20, and receives the encrypted log LGy# from the RIP processing device 30 (step S431). Next, the fourth CPU writes the encrypted logs LGx#, LGy# to the log storage unit 43 (step S432). The second CPU sends, to the ordering device 10, the third private key Kb3 received in step S204 (step S233). The first CPU receives the third private key Kb3 from the editing device 20 (step S134).

Next, the first CPU sends, to the log management device 40, a log request showing that a log read is requested (step S135). The fourth CPU receives the log request from the ordering device 10 (step S436). Next, the fourth CPU reads the encrypted log LG# from the log storage unit 43, and sends the encrypted log LG# to the ordering device 10 (step S437). The first CPU receives the encrypted log LG# from the log management device 40 (step S138). Next, the first CPU decrypts the received encrypted log LG#, using the third private key Kb3 received in step S134 (step S139). Next, the first CPU displays, to the screen, the log LG obtained in step S139 (step S140).

The constituents of the print system 1 shown in FIG. 2, the constituents of the computer 200 shown in FIG. 3, and the steps shown in FIGS. 4 and 5 correspond as follows. The first CPU executing steps S107, S109, S134, S135, and S138 and the communication unit 206 function as the communication unit 11. The first CPU executing step S108 functions as the manuscript data encryption unit 12. The first CPU executing step S139 functions as the log decryption unit 13. The first CPU executing step S140 and the display unit 205 function as the log display unit 14.

The second CPU executing steps S204, S206, S210, S213, S216, S224, and S233 and the communication unit 206 function as the communication unit 21. The second CPU executing step S205 functions as the key generation unit 22. The second CPU executing step S214 functions as the manuscript data decryption unit 23. The second CPU executing step S215 functions as the encrypted print data generation unit 24. The second CPU executing step S221 functions as the finish processing unit 25. The second CPU executing step S223 functions as the log encryption unit 26.

The third CPU executing steps S303, S312, S317, and S329 and the communication unit 206 function as the communication unit 31. The third CPU executing step S311 functions as the key generation unit 32. The third CPU executing step S318 functions as the print data decryption unit 33. The third CPU executing step S319 functions as the RIP processing unit 34. The third CPU executing step S320 functions as the printing machine control unit 35. The third CPU executing step S326 functions as the finish processing unit 36. The third CPU executing step S328 functions as the log encryption unit 37. The fourth CPU executing steps S402, S431, S436, and S437 and the communication unit 206 function as the communication unit 41. The fourth CPU executing step S401 functions as the key generation unit 42.

Hereinafter, effects of the print system 1 according to the present embodiment will be described. In the print system 1, the first private key Kb1, the second private key Kb2, and the RIP-processed data RD are deleted by the action of the finish processing units 25, 36 after finishing the printing. The editing device 20 receives the encrypted manuscript data MD#. It is only the manuscript data decryption unit 23 having the first private key Kb1 that can decrypt the manuscript data MD# encrypted using the first public key Ka1. Therefore, after the first private key Kb1 is deleted by the action of the finish processing unit 25 after finishing the printing, the encrypted manuscript data MD# cannot be decrypted. The RIP processing device 30 receives the encrypted print data PD#. It is only the print data decryption unit 33 having the second private key Kb2 that can decrypt the print data PD# encrypted using the second public key Ka2. Therefore, after the second private key Kb2 is deleted by the action of the finish processing unit 36 after finishing the printing, the encrypted print data PD# cannot be decrypted. Moreover, at the time of finishing the printing, the manuscript data MD has been deleted in the editing device 20, and the print data PD and the RIP-processed data RD has been deleted in the RIP processing device 30. Therefore, according to the print system 1, it is possible to prevent unauthorized use of the manuscript data MD, the print data PD, and the RIP-processed data RD which are generated when the print job is executed.

Moreover, the log storage unit 43 stores the log LG which shows the execution process of the print job, the log LG including a record that the finish processing units 25, 36 have been operated. The log LG stored in the log storage unit 43 is encrypted using the third public key Ka3 retained in a secret state in the editing device 20 and the RIP processing device 30. It is only the log encryption units 26, 37 having the third public key Ka3 that can generate the encrypted log LG# using the third public key Ka3. Therefore, if the log decryption unit 13 can decrypt the encrypted log LG# read from the log storage unit 43, using the third private key Kb3, it can be assured that the log LG has been generated by the editing device 20 or the RIP processing device 30. Therefore, according to the print system 1, it is possible to prevent altering of the log LG, and correctly trace the execution process of the print job.

When the security code is printed using the print system 1, the manuscript data MD is image data of the security code. According to the print system 1, it is possible to prevent unauthorized use of an image data of the security code generated when the printing is performed, the print data having a page including the security code, and the RIP-processed data with which the security code can be printed, and prevent unauthorized distribution of the security code. Moreover, it is possible to prevent altering of the log LG, and correctly trace the execution process of the print job in which the security code is printed. Therefore, it is possible to prevent fake of a product and protect bland of the product, by attaching, to the product, a product label on which the security code is printed or using a product package on which the security code is printed.

As described above, in the print system 1, the editing device 20 functions as a job execution device which performs a job execution method for generating second data (encrypted print data PD#) based on first data (manuscript data MD). The editing device 20 includes the key generation unit 22 configured to generate a public key (first public key Ka1) and a private key (first private key Kb1) which are necessary for encryption communication of the first data; the communication unit 21 configured to send the public key and receive encrypted first data (encrypted manuscript data MD#); a data decryption unit (manuscript data decryption unit 23) configured to decrypt the encrypted first data received by the communication unit 21; a data processing unit (encrypted print data generation unit 24) configured to generate the second data based on the first data obtained by the data decryption unit; the finish processing unit 25 configured to delete at least the private key after finishing execution of a job (print job); and the log encryption unit 26 configured to encrypt, using a public log key (third public key Ka3), the log LGx which shows the execution process of the job, the log LGx including information that the finish processing unit 25 has been operated. The communication unit 21 receives the first data encrypted using the public key, and the data decryption unit decrypts the encrypted first data received by the communication unit 21, using the private key. The first data is data representing a material included in a printed matter, and the second data is data obtained by encrypting data representing a page of the printed matter.

According to the editing device 20, it is possible to prevent unauthorized use of data generated in execution of the job, by receiving the first data by the encryption communication and deleting the private key after finishing execution of the job. Moreover, it is possible to prevent altering of the log and correctly trace the execution process of the job, by encrypting the log using the public log key. Moreover, it is possible to prevent unauthorized flow out of the first data in receiving, by receiving the first data using the public key encryption scheme. Moreover, when generating the print data representing the page of the printed matter based on the manuscript data representing the material included in the printed matter, the above-mentioned effects can be attained.

In the print system 1, the RIP processing device 30 also functions as a job execution device which performs a job execution method for generating second data (RIP-processed data RD) based on first data (print data PD). The RIP processing device 30 includes the key generation unit 32 configured to generate a public key (second public key Ka2) and a private key (second private key Kb2) which are necessary for encryption communication of the first data; the communication unit 31 configured to send the public key and receive encrypted first data (encrypted print data PD#); a data decryption unit (print data decryption unit 33) configured to decrypt the encrypted first data received by the communication unit 31; a data processing unit (RIP processing unit 34) configured to generate the second data based on the first data obtained by the data decryption unit;

the finish processing unit 36 configured to delete at least the private key after finishing execution of a job (print job); and the log encryption unit 37 configured to encrypt, using a public log key (third public key Ka3), the log LGy which shows the execution process of the job, the log LGy including information that the finish processing unit 36 has been operated. The communication unit 31 receives the first data encrypted using the public key, and the data decryption unit decrypts the encrypted first data received by the communication unit 31, using the private key. The first data is data representing a page of a printed matter, and the second data is processable by a printing machine. According to the RIP processing device 30, when generating the data processable by the printing machine based on the print data, effects similar to those attained by the editing device 20 can be attained.

In the print system 1, a device obtained by combining the editing device 20 and the RIP processing device 30 functions as a job execution device which performs a job execution method for generating second data (encrypted print data PD#) based on first data (manuscript data MD) and further generating fourth data (RIP-processed data RD). In the device obtained by combining the editing device 20 and the RIP processing device 30, the second data is data obtained by encrypting third data (print data PD), the third data being based on the first data. In addition to the constituents of the editing device 20, the device obtained by combining the editing device 20 and the RIP processing device 30 includes a second key generation unit (key generation unit 32) configured to generate the second public key Ka2 and the second private key Kb2 which are necessary for encryption communication of the third data; a second communication unit (communication unit 31) configured to send the second public key Ka2 to the communication unit 21 and receive the second data from the communication unit 21; a second data decryption unit (print data decryption unit 33) configured to obtain the third data by decrypting the second data received by the second communication unit; a second data processing unit (RIP processing unit 34) configured to generate the fourth data based on the third data obtained by the second data decryption unit; a second finish processing unit (finish processing unit 36) configured to delete at least the second private key after execution of the job (print job); and a second log encryption unit (log encryption unit 37) configured to encrypt, using the public log key (third public key Ka3), a second log (log LGy) which shows the execution process of the job, the second log including information that the second finish processing unit has been operated. The communication unit 21 receives the first data encrypted using the public key, the data decryption unit decrypts the encrypted first data received by the communication unit 21, using the private key, the data processing unit generates the second data by encrypting using the second public key, and the second data decryption unit decrypts the second data received by the second communication unit, using the second private key. The first data is data representing a material included in a printed matter, the second data is data obtained by encrypting data representing a page of the printed matter, and the fourth data is data processable by a printing machine.

According to the device obtained by combining the editing device 20 and the RIP processing device 30, it is possible to prevent unauthorized use of data generated in execution of the job, by sending and receiving the first data and the second data by the encryption communication and deleting the private key and the second private key after finishing the execution of the job. Moreover, it is possible to prevent altering of the log and correctly trace the execution process of the job, by encrypting the log and the second log using the public log key. Moreover, it is possible to prevent unauthorized flow out of the first data and the second data in sending and receiving, by receiving the first data and sending and receiving the second data using the public key encryption scheme. Moreover, when generating the print data based on the manuscript data and generating the data processable by the printing machine based on the print data, the above-described effects can be attained. The device obtained by combining the editing device 20 and the RIP processing device 30 can be realized by a computer which executes a program (editing/RIP processing program) having functions of an editing program and functions of a RIP processing program.

(Second Embodiment)

Figure 6:
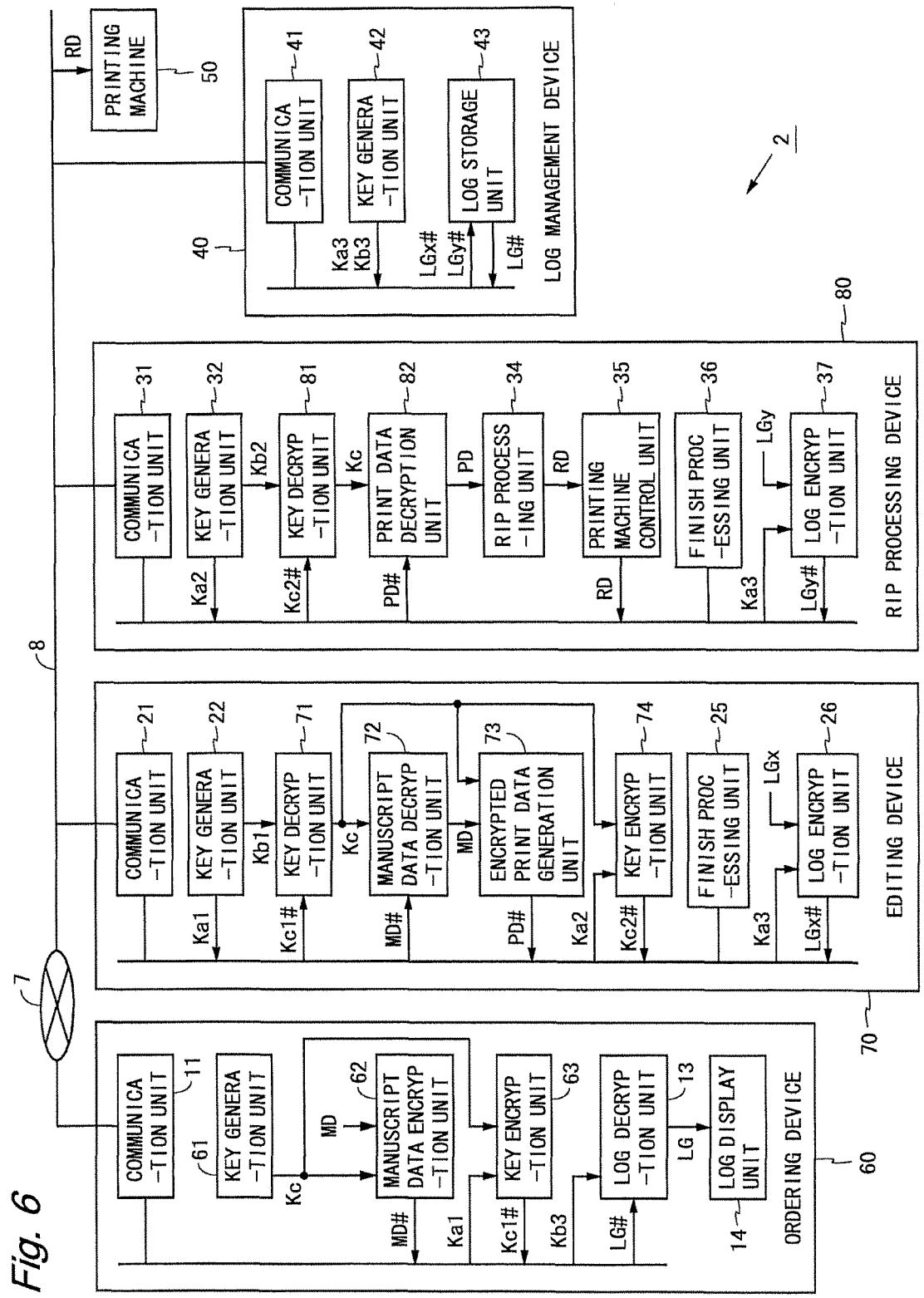
FIG. 6 is a block diagram showing details of a print system according to a second embodiment of the present invention.

FIG. 6 is a block diagram showing details of a print system according to a second embodiment of the present invention. A print system 2 shown in FIG. 6 is obtained by replacing the ordering device 10, the editing device 20, and the RIP processing device 30 in the print system 1 according to the first embodiment with an ordering device 60, an editing device 70, and a RIP processing device 80, respectively. In the following embodiments, among the constituents of each embodiment, a constituent which is the same as that in an aforementioned embodiment is provided with the same reference number, and its description is omitted.

In some cases, the orderer desires to generate and manage the private key in his/her company, instead of entrusting these processing to the printing company. Moreover, when an amount of the manuscript data or the print data is large and the public key encryption scheme is used, it takes time to encrypt and decrypt. Therefore, in the print system 2, there is used a hybrid encryption scheme in which both the public key encryption scheme and a common key encryption scheme are used. Communication using the common key encryption scheme is performed when sending the manuscript data MD from the ordering device 60 to the editing device 70, and when sending the print data PD from the editing device 70 to the RIP processing device 80. DES (Data Encryption Standard) encryption is used for encrypting the manuscript data MD and the print data PD, for example. Communication using the public key encryption scheme is performed when sending the common key from the ordering device 60 to the editing device 70, and when sending the common key from the editing device 70 to the RIP processing device 80. The RSA encryption is used for encrypting the common key, for example.

As shown in FIG. 6, the ordering device 60 is obtained by replacing the manuscript data encryption unit 12 in the ordering device 10 according to the first embodiment with a key generation unit 61, a manuscript data encryption unit 62, and a key encryption unit 63. The editing device 70 is obtained by replacing the manuscript data decryption unit 23 in the editing device 20 according to the first embodiment with a key decryption unit 71 and a manuscript data decryption unit 72, and replacing the encrypted print data generation unit 24 in the editing device 20 with an encrypted print data generation unit 73 and a key encryption unit 74. The RIP processing device 80 is obtained by replacing the print data decryption unit 33 in the RIP processing device 30 according to the first embodiment with a key decryption unit 81 and a print data decryption unit 82.

In the print system 2, a common key Kc is used in addition to the first to third public keys Ka1 to Ka3 and the first to third private keys Kb1 to Kb3. The common key Kc is used for encrypting and decrypting the manuscript data MD, and encrypting and decrypting the print data PD. The first public key Ka1 and the first private key Kb1 are used for encrypting the common key Kc in the ordering device 60 and decrypting the common key Kc in the editing device 70, respectively. The second public key Ka2 and the second private key Kb2 are used for encrypting the common key Kc in the editing device 70 and decrypting the common key Kc in the RIP processing device 80, respectively. The third public key Ka3 and the third private key Kb3 are used for encrypting and decrypting the log LG, respectively. Hereinafter, a common key encrypted using the first public key Ka1 is referred to as Kc1#, and a common key encrypted using the second public key Ka2 is referred to as Kc2#.

The key generation unit 61 generates the common key Kc. The manuscript data encryption unit 62 encrypts, using the common key Kc, the manuscript data MD managed in a secret state by the ordering device 60. The key encryption unit 63 encrypts the common key Kc using the first public key Ka1. The key decryption unit 71 decrypts, using the first private key Kb1, the encrypted common key Kc1# received from the ordering device 60. The manuscript data decryption unit 72 decrypts the encrypted manuscript data MD# received from the ordering device 60, using the common key Kc obtained by the key decryption unit 71.

The encrypted print data generation unit 73 generates the encrypted print data PD# based on the manuscript data MD obtained by the manuscript data decryption unit 72, using the common key Kc. The key encryption unit 74 encrypts the common key Kc using the second public key Ka2. The key decryption unit 81 decrypts, using the second private key Kb2, the encrypted common key Kc2# received from the editing device 70. The print data decryption unit 82 decrypts the encrypted print data PD# received from the editing device 70, using the common key Kc obtained by the key decryption unit 81. The RIP processing unit 34 performs the RIP processing to the print data PD obtained by the print data decryption unit 82, and thus obtains the RIP-processed data RD. The printing machine control unit 35 outputs the RIP-processed data RD to the printing machine 50, and controls the printing machine 50 to perform printing.

The finish processing units 25, 36, the log encryption units 26, 37, and the log decryption unit 13 operate in a manner similar to the first embodiment. However, the finish processing unit 25 included in the editing device 70 deletes at least the first private key Kb1 and the common key Kc. The finish processing unit 36 included in the RIP processing device 80 deletes at least the second private key Kb2 and the common key Kc.

Figure 7:
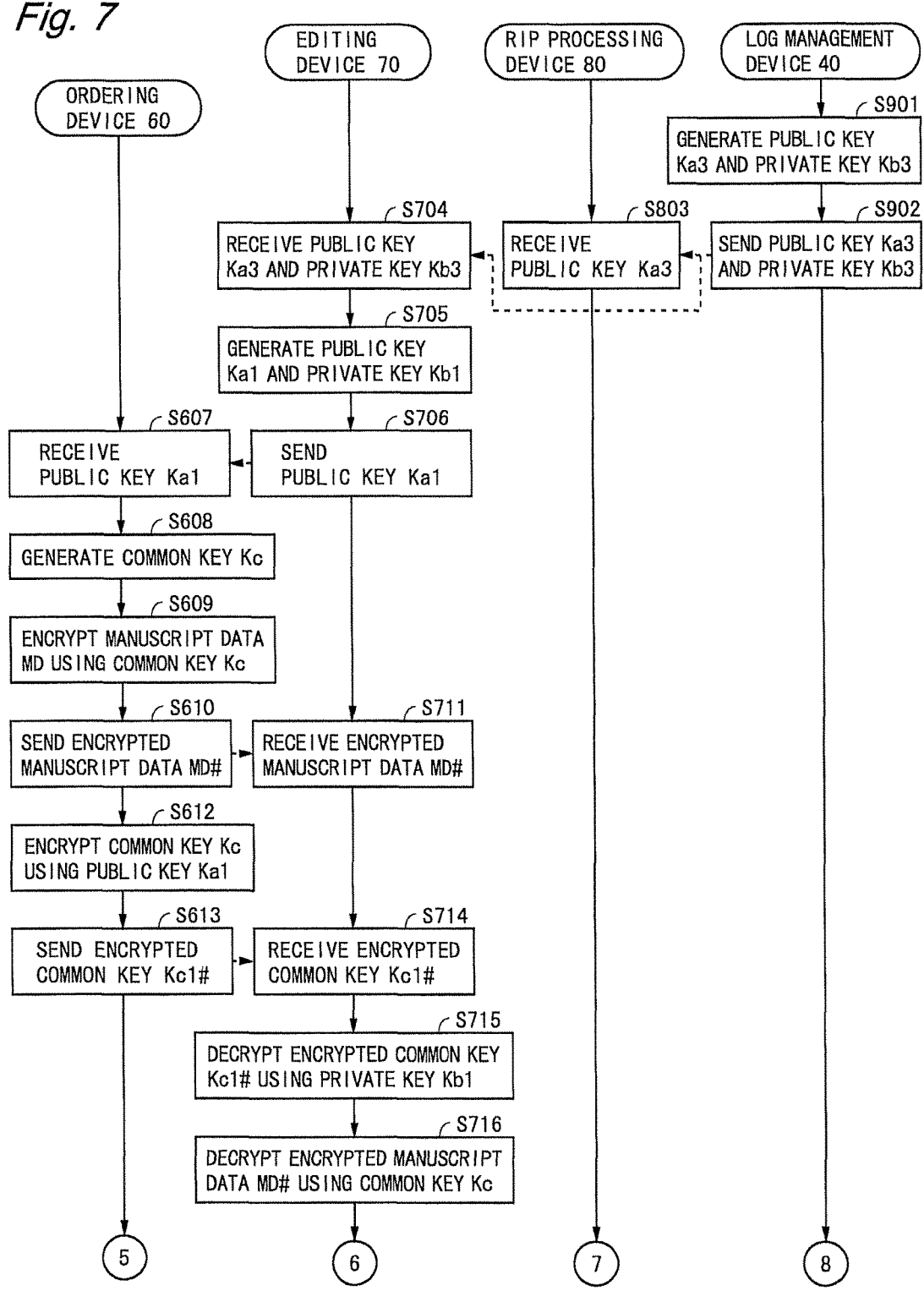
FIG. 7 is a flowchart showing operations of four computers which function as four devices included in the print system shown in FIG. 6.
Figure 8:
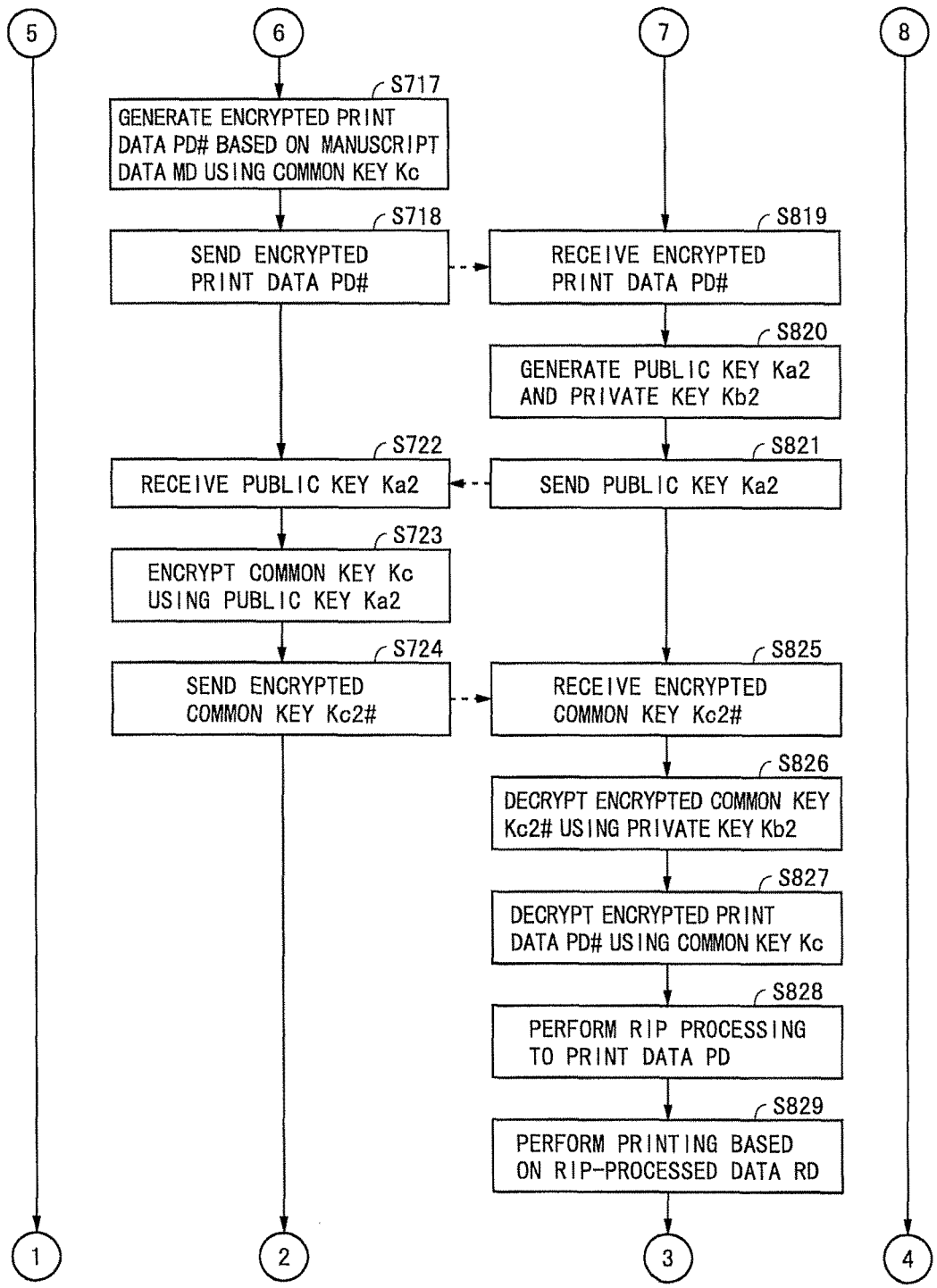
FIG. 8 is a flowchart continued from FIG. 7.

Each of the ordering device 60, the editing device 70, the RIP processing device 80, and the log management device 40 is typically implemented by a computer which executes a program. FIGS. 7 and 8 are flowcharts showing operations of four computers which function as the ordering device 60, the editing device 70, the RIP processing device 80, and the log management device 40.

In FIG. 7, the first to fourth CPUs operate in steps S901, S902, S803, S704 to S706 and S607 in a manner similar to steps S401, S402, S303, S204 to S206 and S107 shown in FIG. 4. Next to step S607, the first CPU generates the common key Kc (step S608). Next, the first CPU encrypts the manuscript data MD using the common key Kc (step S609). Next, the first CPU sends the encrypted manuscript data MD# to the editing device 70 (step S610). The second CPU receives the encrypted manuscript data MD# from the ordering device 60 (step S711).

Next, the first CPU encrypts the common key Kc using the first public key Ka1 received in step S607 (step S612).

Next, the first CPU sends the encrypted common key Kc1# to the editing device 70 (step S613). The second CPU receives the encrypted common key Kc1# from the ordering device 60 (step S714). Next, the second CPU decrypts the encrypted common key Kc1#, using the first private key Kb1 generated in step S705 (step S715). Next, the second CPU decrypts the encrypted manuscript data MD# received in step S711, using the common key Kc obtained in step S715 (step S716). The manuscript data MD obtained in step S716 is stored in the main memory 202, but is not stored in the storage unit 203.

In FIG. 8, next, the second CPU generates the encrypted print data PD# based on the manuscript data MD, using the common key Kc obtained in step S715 (step S717). In step S717, the second CPU performs a processing of generating the print data PD based on the manuscript data MD and a processing of encrypting the generated print data PD using the common key Kc together and inseparably. The print data PD which is intermediate data is stored in the main memory 202, but is not stored in the storage unit 203. In step S717, the second CPU releases memory area of the manuscript data MD and the print data PD in the main memory 202 after generating the encrypted print data PD#. Thus, the manuscript data MD and the print data PD are deleted in step S717.

Next, the second CPU sends the encrypted print data PD# to the RIP processing device 80 (step S718). The third CPU receives the encrypted print data PD# from the editing device 70 (step S819). Next, the third CPU generates the second public key Ka2 and the second private key Kb2 (step S820). Next, the third CPU sends the second public key Ka2 to the editing device 70 (step S821). The second CPU receives the second public key Ka2 from the RIP processing device 80 (step S722).

Next, the second CPU encrypts, using the second public key Ka2, the common key Kc obtained in step S715 (step S723). Next, the second CPU sends the encrypted common key Kc2# to the RIP processing device 80 (step S724). The third CPU receives the encrypted common key Kc2# from the editing device 70 (step S825). Next, the third CPU decrypts the encrypted common key Kc2#, using the second private key Kb2 generated in step S820 (step S826). Next, the third CPU decrypts the encrypted print data PD# received in step S819, using the common key Kc obtained in step S826 (step S827). Next, the third CPU performs the RIP processing to the print data PD, and thus obtains the RIP-processed data RD (step S828). In step S828, the third CPU deletes the print data PD after obtaining the RIP-processed data RD. Next, the third CPU performs printing based on the RIP-processed data RD, as with step S320 shown in FIG. 5 (step S829).

The first to fourth CPUs perform the processing shown in FIG. 5, following to the processing shown in FIGS. 7 and 8. After executing step S613, the first CPU executes steps S134, S135, and S138 to S140 shown in FIG. 5. After executing step S724, the second CPU executes steps S221 to S225 and S233 shown in FIG. 5. After executing step S829, the third CPU executes step S326 to S330 shown in FIG. 5. After executing step S902, the fourth CPU executes steps S431, S432, S436, and S437 shown in FIG. 5.

In the print system 2, the editing device 70 functions as a job execution device which performs a job execution method for generating second data (encrypted print data PD#) based on first data (manuscript data MD). The editing device 70 includes the communication unit 21, the key generation unit 22, a data decryption unit (manuscript data decryption unit 72), a data processing unit (encrypted print data generation unit 24), the finish processing unit 25, and the log encryption unit 26. The communication unit 21 receives the first data (encrypted manuscript data MD#) encrypted using the common key Kc, the data decryption unit decrypts the encrypted first data received by the communication unit 21, using the common key Kc, and the finish processing unit 25 deletes the common key Kc after finishing execution of a job (print job). According to the editing device 70, it is possible to prevent unauthorized flow out of the first data in receiving, by receiving the first data using both the public key encryption scheme and the common key encryption scheme. Moreover, by encrypting and decrypting using the common key Kc, it is possible to perform these processing at high speed.

In the print system 2, the RIP processing device 80 also functions as a job execution device which performs a job execution method for generating second data (RIP-processed data RD) based on first data (print data PD). The RIP processing device 80 includes the communication unit 31, the key generation unit 32, a data decryption unit (print data decryption unit 82), a data processing unit (RIP processing unit 34), the finish processing unit 36, and the log encryption unit 37. The communication unit 31 receives the first data (encrypted print data PD#) encrypted using the common key Kc, the data decryption unit decrypts the encrypted first data received by the communication unit 31, using the common key Kc, and the finish processing unit 36 deletes the common key Kc after finishing execution of a job (print job). According to the RIP processing device 80, effects similar to those attained by the editing device 70 can be attained.

In the print system 2, a device obtained by combining the editing device 70 and the RIP processing device 80 functions as a job execution device which performs a job execution method for generating second data (encrypted print data PD#) based on first data (manuscript data MD) and further generating fourth data (RIP-processed data RD). The communication unit 21 receives the first data (encrypted manuscript data MD#) encrypted using the common key Kc, a data decryption unit (manuscript data decryption unit 72) decrypts the encrypted first data received by the communication unit 21, using the common key Kc, a data processing unit (encrypted print data generation unit 73) generates the second data by encrypting using the common key Kc, a second data decryption unit (print data decryption unit 82) decrypts the second data received by a second communication unit (communication unit 31), using the common key Kc, and the finish processing unit 25 and a second finish processing unit (finish processing unit 36) delete the common key Kc after finishing execution of a job (print job). According to the device obtained by combining the editing device 70 and the RIP processing device 80, it is possible to prevent unauthorized flow out of the first data and the second data in sending and receiving by receiving the first data and sending and receiving the second data by using both the public key encryption scheme and the common key encryption scheme. Moreover, by encrypting and decrypting using the common key Kc, it is possible to perform these processing at high speed.

(Third Embodiment)

Figure 9:
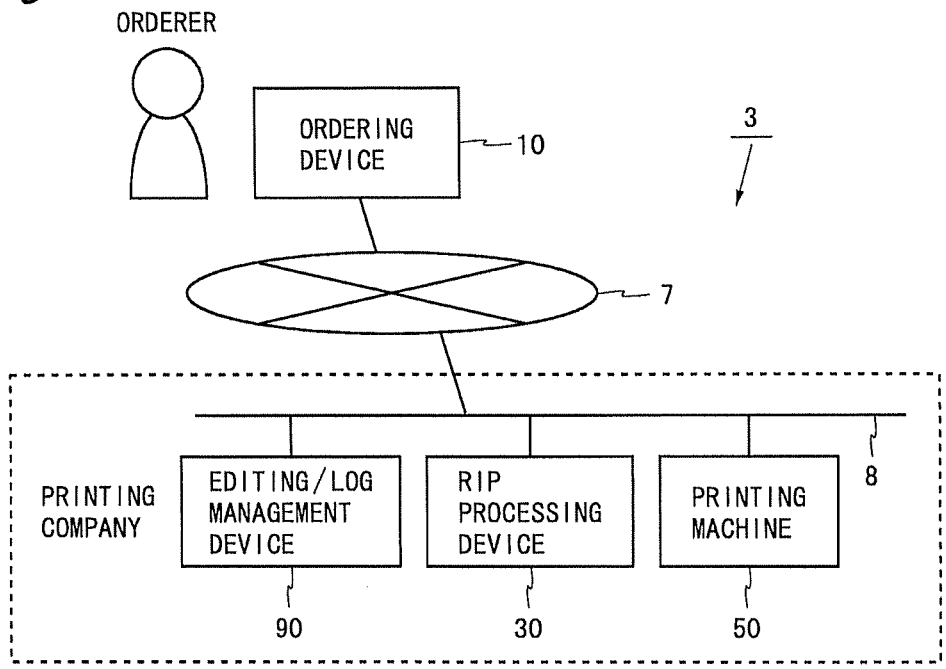
FIG. 9 is a block diagram showing a configuration of a print system according to a third embodiment of the present invention.

FIG. 9 is a block diagram showing a configuration of a print system according to a third embodiment of the present invention. A print system 3 shown in FIG. 9 is obtained by replacing the editing device 20 and the log management device 40 in the print system 1 according to the first embodiment, with an editing/log management device 90. The editing/log management device 90 is obtained by adding functions of the log management device 40 to the editing device 20. The editing/log management device 90 is implemented by a computer which executes an editing program and a log management program. According to the print system 3, it is possible to reduce the number of devices (computers) included in the print system and reduce cost of the print system.

The print system 3 includes the editing/log management device 90 obtained by adding functions of the log management device 40 to the editing device 20. In place of this, the print system 3 may include a RIP processing/log management device obtained by adding functions of the log management device 40 to the RIP processing device 30. Moreover, functions of the log management device 40 may be added to the editing device 70 or the RIP processing device 80 according to the second embodiment.

(Fourth Embodiment)

Figure 10:
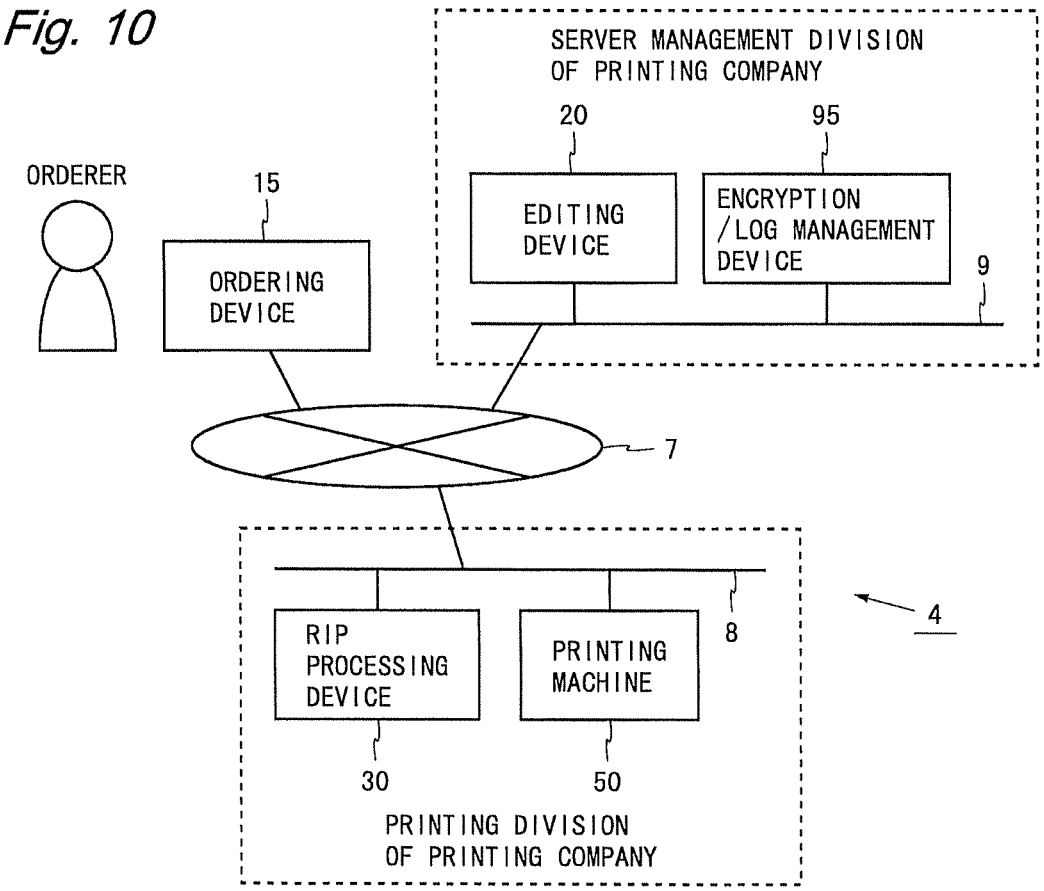
FIG. 10 is a block diagram showing a configuration of a print system according to a fourth embodiment of the present invention.

FIG. 10 is a block diagram showing a configuration of a print system according to a fourth embodiment of the present invention. A print system 4 shown in FIG. 10 includes an ordering device 15, the editing device 20, the RIP processing device 30, an encryption/log management device 95, and the printing machine 50. The ordering device 15 is placed at a location of an orderer who orders printing. The RIP processing device 30 and the printing machine 50 are placed in a printing division of a printing company and are connected to the local area network 8 in the printing division. The editing device 20 and the encryption/log management device 95 are placed in a server management division of the printing company and are connected to a local area network 9 in the server management division. The ordering device 15 is connected to the editing device 20 and the encryption/log management device 95 so as to communicate with these devices using the wide area network 7 such as the Internet. The RIP processing device 30 is also connected to the editing device 20 and the encryption/log management device 95 so as to communicate with these devices using the wide area network 7.

Figure 11:
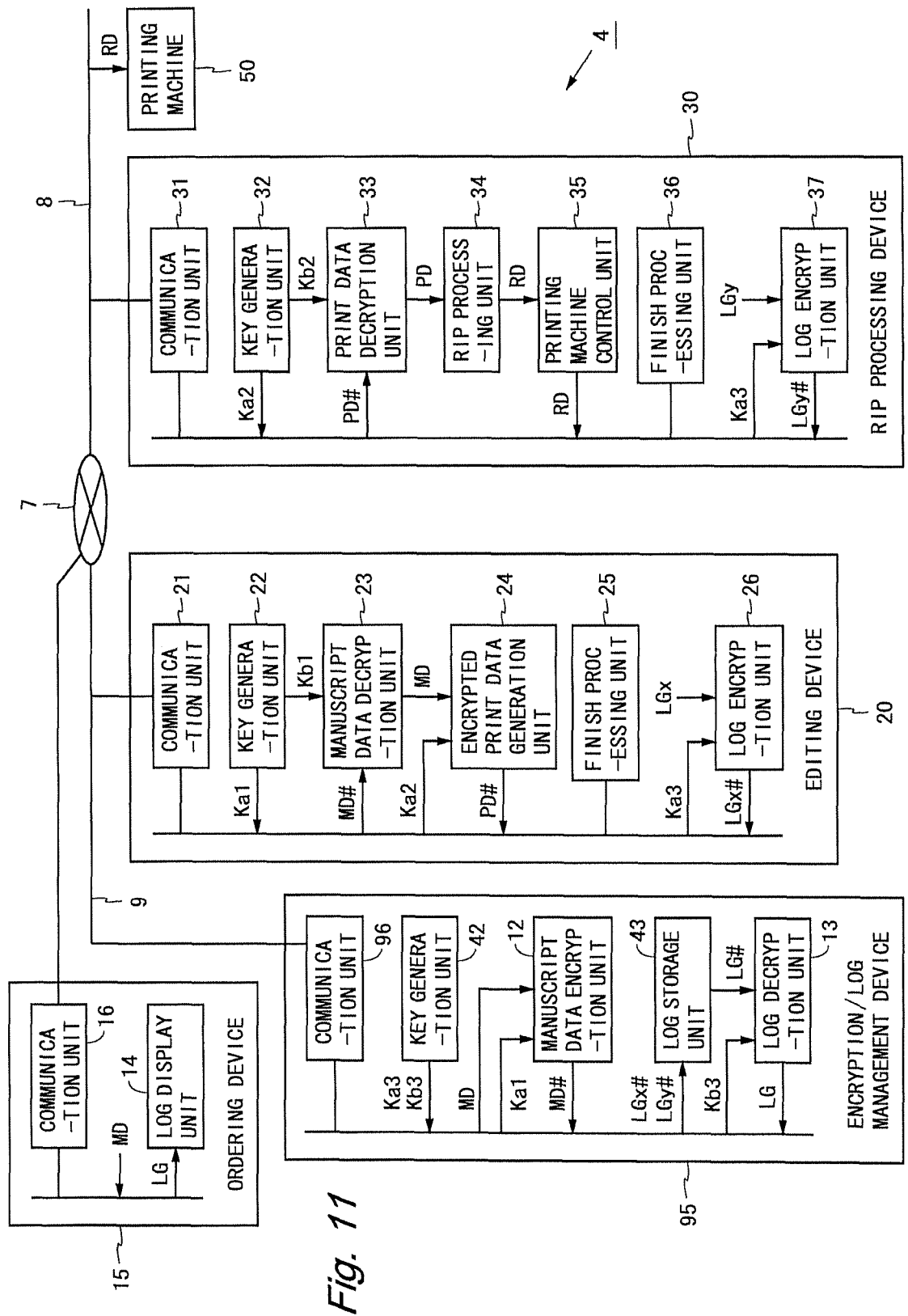
FIG. 11 is a block diagram showing details of the print system shown in FIG. 10.

FIG. 11 is a block diagram showing details of the print system 4. The ordering device 15 includes a communication unit 16 and the log display unit 14. The encryption/log management device 95 includes a communication unit 96, the key generation unit 42, the manuscript data encryption unit 12, the log storage unit 43, and the log decryption unit 13.

The ordering device 15 sends the manuscript data MD to the editing device 20 via the encryption/log management device 95. When sending the manuscript data MD from the ordering device 15 to the encryption/log management device 95, there is used an encryption communication provided by browser software which runs on a computer that constitutes the ordering device 15 (hereinafter referred to as "encryption communication by browser"). Communication using the public key encryption scheme is performed when sending the manuscript data MD from the encryption/log management device 95 to the editing device 20.

The editing device 20 and the RIP processing device 30 generate the logs LGx, LGy which show the execution process of printing, and write the logs to the log storage unit 43 in the encryption/log management device 95. The log LG is written to the log storage unit 43 in a state encrypted using the public key encryption scheme. The log decryption unit 13 decrypts the encrypted log LG# stored in the log storage unit 43. After finishing the printing, the ordering device 15 receives the log LG obtained by the log decryption unit 13, from the encryption/log management device 95, and displays the received log LG to a screen. When displaying the log LG to the screen, browser software which runs on a computer that constitutes the ordering device 15 is used.

The communication units 16, 21, 31, 96 send and receive data and keys among the ordering device 15, the editing device 20, the RIP processing device 30, and the encryption/log management device 95. However, the encryption communication by the browser is performed between the communication units 16, 96. The key generation units 22, 32, 42 operate in a manner similar to the first embodiment. In the print system 4, the first public key Ka1 is sent from the editing device 20 to the encryption/log management device 95. The third private key Kb3 is retained in a secret state in the encryption/log management device 95.

The manuscript data MD is sent from the ordering device 15 to the encryption/log management device 95. The encryption communication by the browser is used when sending the manuscript data MD. The manuscript data encryption unit 12 encrypts, using the first public key Ka1, the manuscript data MD received from the ordering device 15. The encrypted manuscript data MD# is sent from the encryption/log management device 95 to the editing device 20. The manuscript data decryption unit 23 decrypts, using the first private key Kb1, the encrypted manuscript data MD# received from the encryption/log management device 95. The encrypted print data generation unit 24, the print data decryption unit 33, the RIP processing unit 34, the printing machine control unit 35, the finish processing units 25, 36, and the log encryption units 26, 37 operate in a manner similar to the first embodiment.

The log LGx# encrypted by the log encryption unit 26 is sent from the editing device 20 to the encryption/log management device 95 and is written to the log storage unit 43. The log LGy# encrypted by the log encryption unit 37 is sent from the RIP processing device 30 to the encryption/log management device 95 and is written to the log storage unit 43. The log decryption unit 13 decrypts, using the third private key Kb3, the encrypted log LG# stored in the log storage unit 43. The log LG obtained by the log decryption unit 13 is sent to the ordering device 15. The log display unit 14 displays, to the screen, the log LG received from the encryption/log management device 95.

In the print system 4, the encryption/log management device 95 encrypts, using the first public key Ka1, the manuscript data MD received from the ordering device 15 and decrypts, using the third private key Kb3, the log LG# stored in the log storage unit 43. When the manuscript data MD is sent from the ordering device 15 to the encryption/log management device 95, the encryption communication by the browser is performed. The ordering device 15 displays the log LG to the screen using the browser software. Therefore, according to the print system 4, it is possible to constitute the ordering device 15, without adding new software to a computer managed by the orderer.

(Fifth Embodiment)

Figure 12:
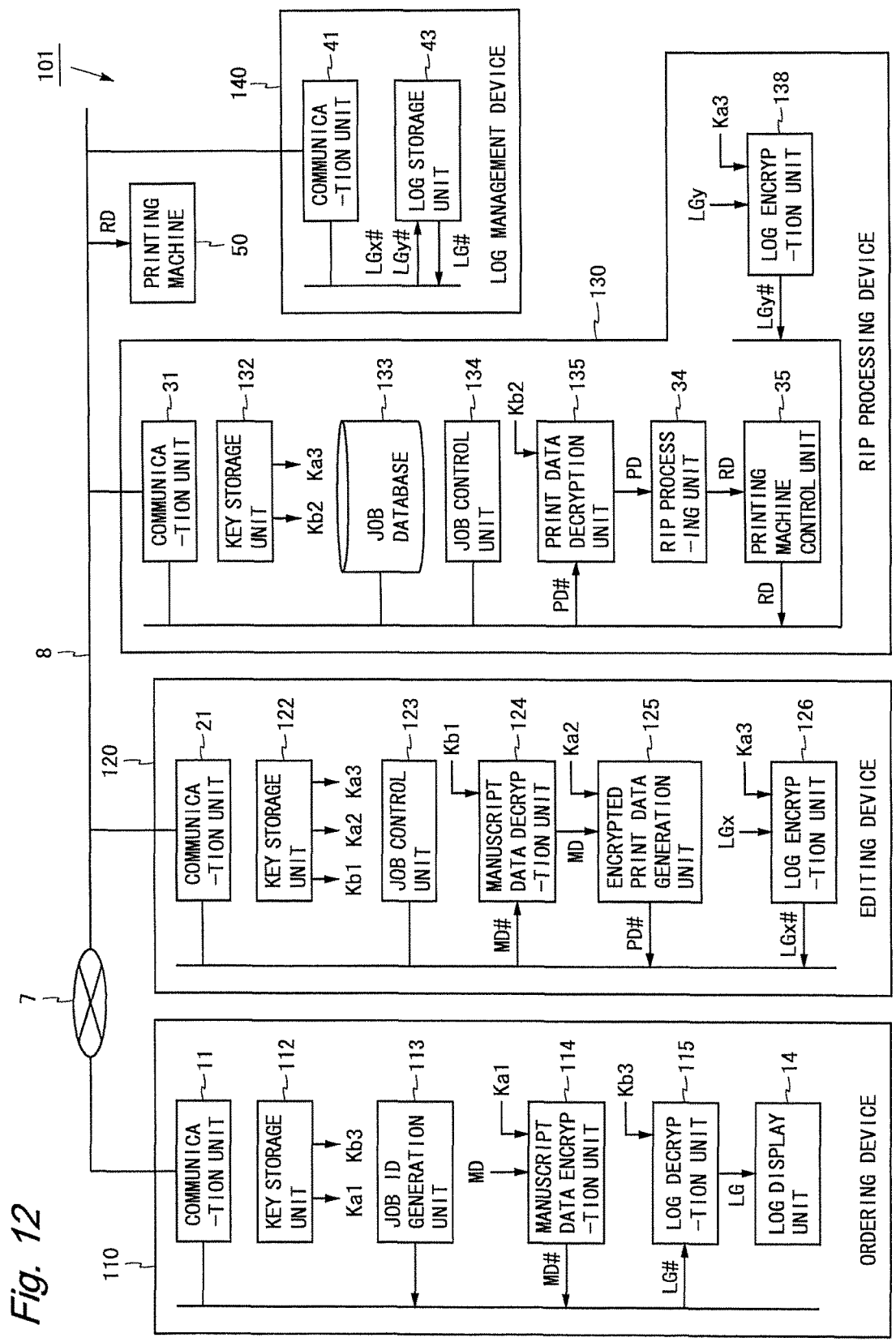
FIG. 12 is a block diagram showing details of a print system according to a fifth embodiment of the present invention.

FIG. 12 is a block diagram showing details of a print system according to a fifth embodiment of the present invention. A print system 101 shown in FIG. 12 is obtained by replacing the ordering device 10, the editing device 20, the RIP processing device 30, and the log management device 40 in the print system 1 (FIG. 2) according to the first embodiment with an ordering device 110, an editing device 120, a RIP processing device 130, and a log management device 140, respectively.

The ordering device 110 includes the communication unit 11, a key storage unit 112, a job ID generation unit 113, a manuscript data encryption unit 114, a log decryption unit 115, and the log display unit 14. The editing device 120 includes the communication unit 21, a key storage unit 122, a job control unit 123, a manuscript data decryption unit 124, an encrypted print data generation unit 125, and a log encryption unit 126. The RIP processing device 130 includes the communication unit 31, a key storage unit 132, a job database 133, a job control unit 134, a print data decryption unit 135, the RIP processing unit 34, the printing machine control unit 35, and a log encryption unit 138. The log management device 140 includes the communication unit 41 and the log storage unit 43. In print systems according to fifth to eighth embodiments, differently from the print systems according to the first to fourth embodiments, the public keys Ka1 to Ka3 and the private keys Kb1 to Kb3 are stored in one of the key storage units before starting execution of a job.

The first private key Kb1 is a key which is uniquely determined for the editing device 120 and is specific to the editing device 120, and is generated in the editing device 120. Generating means thereof may be, for example, generating using a random number or an arbitrary calculation formula, inputting by an operator using an input unit such as a keyboard, or the like. The generated first private key Kb1 is retained in a secret state in the key storage unit 122 without being output outside the editing device 120. The first public key Ka1 is a key which makes a pair with the first private key Kb1. After generated in the editing device 120 in a manner similar to the first private key Kb1, the first public key Ka1 is sent to the ordering device 110 and is retained in the key storage unit 112 in the ordering device 110. Sending means thereof is sending through a network via the local area network 8 and the wide area network 7, but other communication means may be used.

The second private key Kb2 is a key which is uniquely determined for the RIP processing device 130 and is specific to the RIP processing device 130, and is generated in the RIP processing device 130 in a manner similar as described above. The generated second private key Kb2 is retained in a secret state in the key storage unit 132 without being output outside the RIP processing device 130. The second public key Ka2 is a key which makes a pair with the second private key Kb2. After generated in the RIP processing device 130 in a manner similar to the second private key Kb2, the second public key Ka2 is sent to the editing device 120 in a manner similar as described above and is retained in the key storage unit 122 in the editing device 120.

The third private key Kb3 is a key specific to the ordering device 110, and is generated in the ordering device 110 in a manner similar as described above. The generated third private key Kb3 is retained in a secret state in the key storage unit 112 without being output outside the ordering device 110. The third public key Ka3 is a key which makes a pair with the third private key Kb3. After generated in the ordering device 110 in a manner similar to the third private key Kb3, the third public key Ka3 is sent to the editing device 120 and the RIP processing device 130 in a manner similar as described above and is retained in the key storage units 122, 132.

Through the above-described generating and sending processes, the first to third public keys Ka1 to Ka3 and the first to third private keys Kb1 to Kb3 are stored in advance in the ordering device 110, the editing device 120, and the RIP processing device 130. More specifically, the key storage unit 112 included in the ordering device 110 stores the first public key Ka1 and the third private key Kb3 before starting execution of the print job. The key storage unit 122 included in the editing device 120 stores the first private key Kb1, the second public key Ka2, and the third public key Ka3 before starting execution of the print job. The key storage unit 132 included in the RIP processing device 130 stores the second private key Kb2 and the third public key Ka3 before starting execution of the print job. The keys stored in the key storage units 112, 122, 132 may be input using the input unit such as a keyboard, may be read from an external storing medium such as a USB memory, or may be received using the communication unit. However, it is preferable from a safety point of view that the private keys Kb1, Kb2, Kb3 be not transferred using a medium such as a network or a USB memory, and each of the private keys be generated in each device and be retained in each device. The key storage units 112, 122, 132 may store the keys in an initial setting of the print system 101. After that, the key storage units 112, 122, 132 may update the stored keys at an arbitrary timing (for example, in scheduled maintenance).

The communication units 11, 21, 31, 41 send and receive data among the ordering device 110, the editing device 120, the RIP processing device 130, and the log management device 140. The communication units 11, 21, 31, 41 may be used for sending and receiving keys.

The job ID generation unit 113 generates an identifier (hereinafter referred to as a job ID) unique to each print job. In the print system 101, whether the print job is to be executed is controlled using the job ID and the job database 133. FIG. 13 is a diagram showing the contents of the job database 133. As shown in FIG. 13, concerning with a print job to be executed by the print system 101 and a print job already executed by the print system 101, a job ID, a status, and a number of printing are stored in the job database 133. Information about the print jobs stored in the job database 133 is retained in the job database 133 without time limit (eternally) in order to prevent unauthorized printing. The job database 133 is managed using encryption, date, check sum, or the like in order to prevent altering.

The job control units 123, 134 controls, based on the job ID, whether the print job is to be executed. The job control unit 123 refers to the job database 133 using the job ID as a search key, and controls, based on the result thereof, whether the print data PD is to be generated. The job control unit 134 refers to the job database 133 using the job ID as a search key, and controls, based on the result thereof, whether printing (including generation of RIP-processed data RD) is to be performed.

The manuscript data encryption unit 114 encrypts the manuscript data MD managed in a secret state by the ordering device 110, using the first public key Ka1 stored in the key storage unit 112. The manuscript data decryption unit 124 decrypts the encrypted manuscript data MD# received from the ordering device 110, using the first private key Kb1 stored in the key storage unit 122. The encrypted print data generation unit 125 generates the encrypted print data PD# based on the manuscript data MD obtained by the manuscript data decryption unit 124, using the second public key Ka2 stored in the key storage unit 122. The encrypted print data generation unit 125 starts processing immediately after the manuscript data decryption unit 124 finishes processing, and deletes the manuscript data MD obtained by the manuscript data decryption unit 124 after generating the encrypted print data PD#. The print data decryption unit 135 decrypts the encrypted print data PD# received from the editing device 120, using the second private key Kb2 stored in the key storage unit 132. The RIP processing unit 34 and the printing machine control unit 35 operate in a manner similar to the first embodiment.

The log encryption unit 126 encrypts the log LGx which shows an execution process of printing in the editing device 120, using the third public key Ka3 stored in the key storage unit 122. The encrypted log LGx# obtained by the log encryption unit 126 is sent from the editing device 120 to the log management device 140 and is written to the log storage unit 43. The log encryption unit 138 encrypts the log LGy which shows the execution process of the printing in the RIP processing device 130, using the third public key Ka3 stored in the key storage unit 132. The encrypted log LGy# obtained by the log encryption unit 138 is sent from the RIP processing device 130 to the log management device 140 and is written to the log storage unit 43.

The log decryption unit 115 and the log display unit 14 operate after finishing the printing. The log decryption unit 115 decrypts the encrypted log LG# read from the log management device 140, using the third private key Kb3 stored in the key storage unit 112. The log display unit 14 displays, to the screen, the log LG obtained by the log decryption unit 115.

Figure 14:
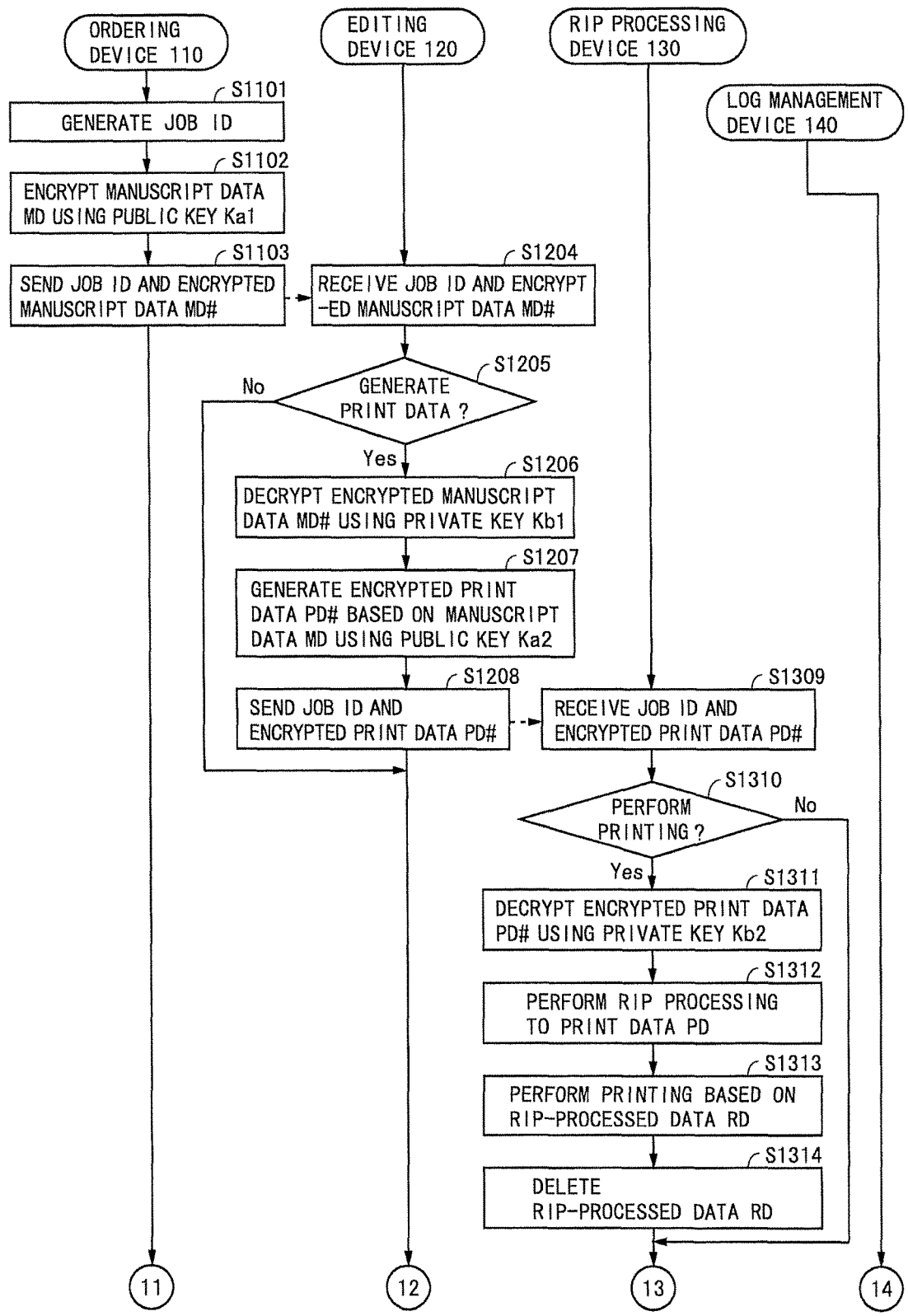
FIG. 14 is a flowchart showing operations of four computers which function as four devices included in the print system shown in FIG. 12.
Figure 15:
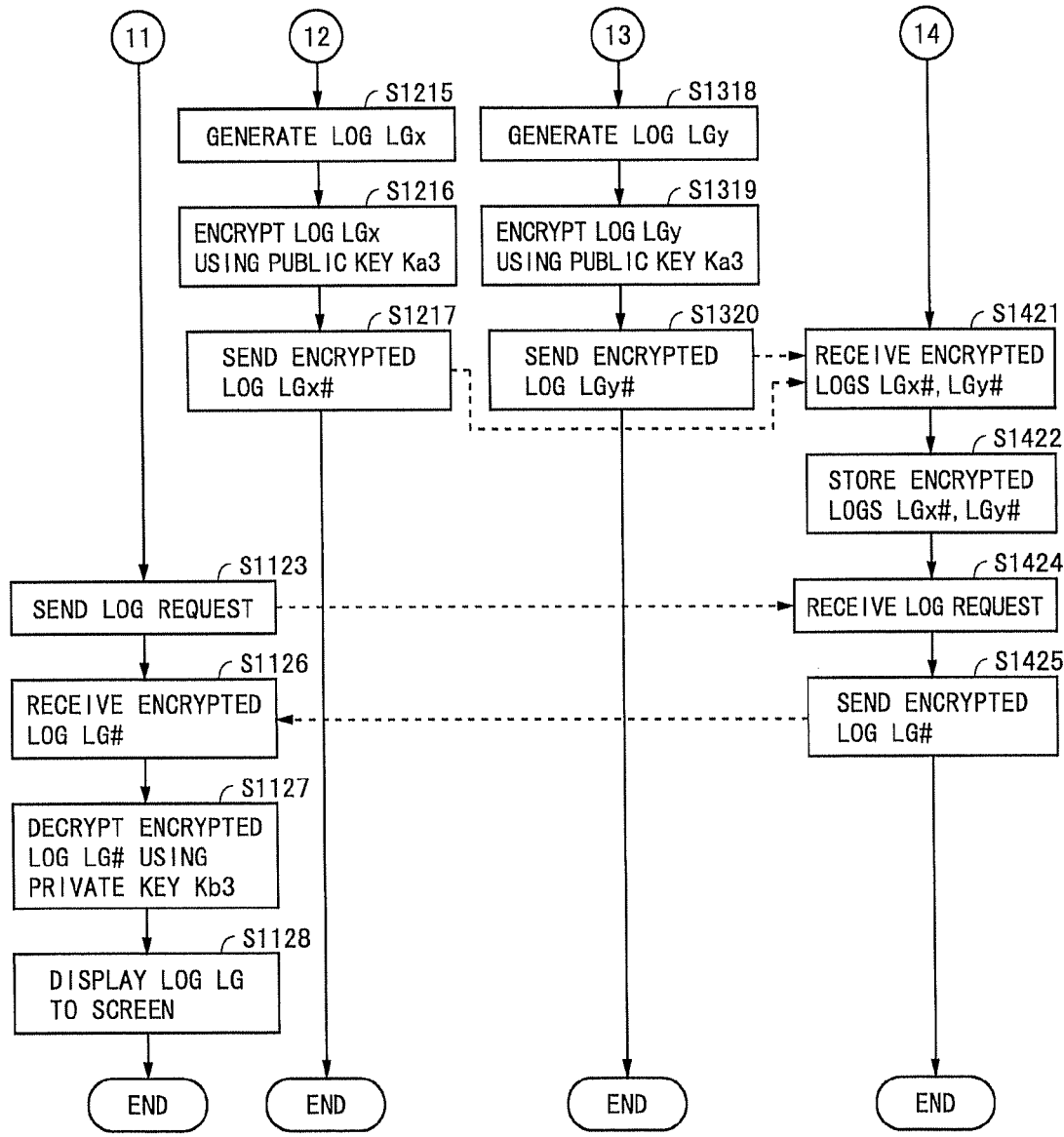
FIG. 15 is a flowchart continued from FIG. 14.

Each of the ordering device 110, the editing device 120, the RIP processing device 130, and the log management device 140 is typically implemented by a computer which executes a program. FIGS. 14 and 15 are flowcharts showing operations of four computers which function as the ordering device 110, the editing device 120, the RIP processing device 130, and the log management device 140.

In FIG. 14, the first CPU generates the job ID which is unique to the print job (step S1101). Next, the first CPU encrypts the manuscript data MD using the first public key Ka1 stored in the key storage unit 112 (step S1102). Next, the first CPU sends the job ID and the encrypted manuscript data MD# to the editing device 120 (step S1103). The second CPU receives the job ID and the encrypted manuscript data MD# from the ordering device 110 (step S1204).

Next, the second CPU determines, based on the received job ID, whether the print data PD is to be generated (step S1205). In step S1205, communication is performed between the editing device 120 and the RIP processing device 130, and the job database 133 is referred using, as a search key, the job ID received in step S1204. Based on the result of referring to the job database 133, it is determined whether the print data PD is to be generated. For example, when a status of the job having the received job ID is stored as "print data generated", "printing", "finished", or the like in the job database 133, the second CPU determines that the print data PD is not to be generated. The second CPU goes to step S1206 when determining Yes, and goes to a step next to step S1208 when determining No.

In the former case, the second CPU decrypts the received encrypted manuscript data MD#, using the first private key Kb1 stored in the key storage unit 122 (step S1206). The manuscript data MD obtained in step S1206 is stored in the main memory 202, but is not stored in the storage unit 203. Next, the second CPU generates the encrypted print data PD# based on the manuscript data MD, using the second public key Ka2 stored in the key storage unit 122 (step S1207). In step S1207, the second CPU performs a processing of generating the print data PD based on the manuscript data MD and a processing of encrypting the generated print data PD using the second public key Ka2 together and inseparably. The print data PD which is intermediate data is stored in the main memory 202, but is not stored in the storage unit 203. In step S1207, the second CPU releases storage area of the manuscript data MD and the print data PD in the main memory 202 after generating the encrypted print data PD#. Thus, the manuscript data MD and the print data PD are deleted in step S1207.

Next, the second CPU sends the job ID received in step S1204 and the encrypted print data PD#, to the RIP processing device 130 (step S1208). The third CPU receives the job ID and the encrypted print data PD# from the editing device 120 (step S1309).

Next, the third CPU determines, based on the received job ID, whether printing is to be performed (step S1310). In step S1310, the job database 133 is referred using, as a search key, the job ID received in step S1309, and based on the result of referring the job database 133, it is determined whether the printing is to be performed. For example, when a status of the job having the received job ID is stored as "printing", "finished", or the like in the job database 133, the third CPU determines that the printing is not to be performed. The third CPU goes to step S1311 when determining Yes, and goes to a step next to step S1314 if when determining No.

In the former case, the third CPU decrypts the encrypted print data PD# received in step S1309, using the second private key Kb2 stored in the key storage unit 132 (step S1311). Next, as with step S319 shown in FIG. 4, the third CPU performs the RIP processing to the print data PD, and thus obtains the RIP-processed data RD (step S1312). Next, the third CPU performs printing based on the RIP-processed data RD, as with step S320 shown in FIG. 4 (step S1313). Next, the third CPU deletes the RIP-processed data RD generated in step S1312 (step S1314).

After executing step S1204, the second CPU generates the log LGx which shows the execution process of the printing in the editing device 120, and sends, to the log management device 140, the log LGx# encrypted using the third public key Ka3 stored in the key storage unit 122. After executing step S1309, the third CPU generates the log LGy which shows the execution process of the printing in the RIP processing device 130, and sends, to the log management device 140, the log LGy# encrypted using the third public key Ka3 stored in the key storage unit 132. The fourth CPU receives the encrypted logs LGx#, LGy# from the editing device 120 and the RIP processing device 130 and writes the logs to the log storage unit 43. These processing are performed at the start of the printing and at an arbitrary timing during the printing, thus their descriptions are omitted in the flowcharts and explanation thereof.

In FIG. 15, the second CPU generates the log LGx which shows that the encrypted print data PD# has been generated, and the like (step S1215). Next, the second CPU encrypts the log LGx using the third public key Ka3 stored in the key storage unit 122 (step S1216). Next, the second CPU sends the encrypted log LGx# to the log management device 140 (step S1217). The third CPU generates the log LGy which shows that the RIP-processed data RD has been generated, a number of printing, that the RIP-processed data RD has been deleted, and the like (step S1318). Next, the third CPU encrypts the log LGy using the third public key Ka3 stored in the key storage unit 132 (step S1319). Next, the third CPU sends the encrypted log LGy# to the log management device 140 (step S1320). The fourth CPU receives the encrypted log LGx# from the editing device 120, and receives the encrypted log LGy# from the RIP processing device 130 (step S1421). Next, the fourth CPU writes the received encrypted logs LGx#, LGy# to the log storage unit 43 (step S1422).

Next, the first CPU sends a log request showing that a log read is requested, to the log management device 140 (step S1123). The fourth CPU receives the log request from the ordering device 110 (step S1424). Next, the fourth CPU reads the encrypted log LG# from the log storage unit 43, and sends the encrypted log LG# to the ordering device 110 (step S1425). The first CPU receives the encrypted log LG# from the log management device 140 (step S1126). Next, the first CPU decrypts the received encrypted log LG#, using the third private key Kb3 stored in the key storage unit 112 (step S1127). Next, the first CPU displays, to the screen, the log LG obtained in step S1127 (step S1128).

Note that it is preferable that the second CPU delete the encrypted manuscript data MD# and the encrypted print data PD# after finishing the printing. It is preferable that the third CPU delete the encrypted print data PD# after finishing the printing.

The constituents of the print system 101 shown in FIG. 12, the constituents of the computer 200 shown in FIG. 3, and the steps shown in FIGS. 14 and 15 correspond as follows. The first CPU executing steps S1103, S1123, and S1126 and the communication unit 206 function as the communication unit 11. The first CPU executing step S1101 functions as the job ID generation unit 113. The first CPU executing step S1102 functions as the manuscript data encryption unit 114. The first CPU executing step S1127 functions as the log decryption unit 115. The first CPU executing step S1128 and the display unit 205 function as the log display unit 14.

The second CPU executing steps S1204, S1208, and S1217 and the communication unit 206 function as the communication unit 21. The second CPU executing step S1205 functions as the job control unit 123. The second CPU executing step S1206 functions as the manuscript data decryption unit 124. The second CPU executing step S1207 functions as the encrypted print data generation unit 125. The second CPU executing step S1216 functions as the log encryption unit 126.

The third CPU executing steps S1309 and S1320 and the communication unit 206 function as the communication unit 31. The third CPU executing step S1310 functions as the job control unit 134. The third CPU executing step S1311 functions as the print data decryption unit 135. The third CPU executing step S1312 functions as the RIP processing unit 34. The third CPU executing step S1313 functions as the printing machine control unit 35. The third CPU executing step S1319 functions as the log encryption unit 138. The fourth CPU executing steps S1421, S1424, and S1425 and the communication unit 206 function as the communication unit 41.

Hereinafter, effects of the print system 101 according to the present embodiment will be described. In the print system 101, the editing device 120 receives the job ID and the encrypted manuscript data MD#. The job control unit 123 controls, based on the received job ID, whether the print data PD is to be generated. When the status of the job is "print data generated", "printing", "finished", or the like, the encrypted manuscript data MD# is not decrypted and the print data PD is not generated. The RIP processing device 130 receives the job ID and the encrypted print data PD#. The job control unit 134 controls, based on the received job ID, whether printing (including generation of the RIP-processed data RD) is to be performed. When the status of the job is "printing", "finish printing", or the like, the encrypted print data PD# and the RIP-processed data RD are not generated, and printing is not performed. In this manner, by receiving the encrypted manuscript data MD# or the encrypted print data PD# and controlling, based on the job ID, whether the job is to be executed, it is possible to prevent unauthorized use of the manuscript data MD, the print data PD, and the RIP-processed data RD which are generated when the job is executed.

Moreover, the log storage unit 43 stores the log LG which shows the execution process of the print job. The log LG stored in the log storage unit 43 is encrypted using the third public key Ka3 retained in a secret state in the editing device 120 and the RIP processing device 130. It is only the log encryption units 126, 138 having the third public key Ka3 that can generate the encrypted log LG# using the third public key Ka3. Therefore, if the log decryption unit 115 can decrypt the encrypted log LG# read from the log storage unit 43, using the third private key Kb3, it can be assured that the log LG has been generated by the editing device 120 or the RIP processing device 130. Therefore, according to the print system 101, it is possible to prevent altering of the log LG, and correctly trace the execution process of the print job. When the security code is printed using the print system 101, effects similar to those attained when the security code is printed using the print system 1 can be attained.

As described above, in the print system 101, the editing device 120 functions as a job execution device which performs a job execution method for generating second data (encrypted print data PD#) based on first data (manuscript data MD). The editing device 120 includes the key storage unit 122 configured to store a private key (first private key Kb1) which is necessary for the encryption communication of the first data before the execution of a job (print job); the communication unit 21 configured to receive the job ID and the encrypted first data (encrypted manuscript data MD#); the job control unit 123 configured to control whether the job is to be executed, based on the job ID received by the communication unit 21; a data decryption unit (manuscript data decryption unit 124) configured to decrypt the encrypted first data received by the communication unit 21; a data processing unit (encrypted print data generation unit 125) configured to generate the second data based on the first data obtained by the data decryption unit; and the log encryption unit 126 configured to encrypt, using the public log key (third public key Ka3), the log LGx which shows an execution process of the job. The communication unit 21 receives the first data encrypted using the public key (first public key Ka1) which makes a pair with the private key, and the data decryption unit decrypts the encrypted first data received by the communication unit 21, using the private key. The first data is data representing a material included in a printed matter, and the second data is data obtained by encrypting data representing a page of the printed matter.

According to the editing device 120, by receiving the first data by the encryption communication, and controlling, based on the job ID, whether the job is to be performed, it is possible to prevent unauthorized use of data which are generated during the execution process of the job. Moreover, by encrypting the log using the public log key, it is possible to prevent altering of the log, and correctly trace the execution process of the job. Moreover, by receiving the first data using the public key encryption scheme, it is possible to prevent unauthorized flow out of the first data in receiving. Moreover, when generating the print data representing the page of the printed matter based on the manuscript data representing the material included in the printed matter, the above-mentioned effects can be attained.

In the print system 101, the RIP processing device 130 also functions as a job execution device which performs a job execution method for generating second data (RIP-processed data RD) based on first data (print data PD). The RIP processing device 130 includes the key storage unit 132 configured to store a private key (second private key Kb2) which is necessary for the encryption communication of the first data before staring the execution of a job (print job); the communication unit 31 configured to receive the job ID and the encrypted first data (encrypted print data PD#); the job control unit 134 configured to control whether the job is to be performed, based on the job ID received by the communication unit 31; a data decryption unit (print data decryption unit 135) configured to decrypt the encrypted first data received by the communication unit 31; a data processing unit (RIP processing unit 34) configured to generate the second data based on the first data obtained by the data decryption unit; and the log encryption unit 138 configured to encrypt the log LGy which shows an execution process of the job, using the public log key (third public key Ka3). The communication unit 31 receives the first data encrypted using the public key (second public key Ka2) which make a pair with the private key, and the data decryption unit decrypts the encrypted first data received by the communication unit 31, using the private key. The first data is data representing a page of a printed matter, and the second data is data processable by a printing machine. According to the RIP processing device 130, when generating the data processable by the printing machine based on the print data, effects similar to those attained by the editing device 120 can be attained.

In the print system 101, a device obtained by combining the editing device 120 and the RIP processing device 130 functions as a job execution device which performs a job execution method for generating second data (encrypted print data PD#) based on first data (manuscript data MD) and further generating fourth data (RIP-processed data RD). In the device obtained by combining the editing device 120 and the RIP processing device 130, the second data is data obtained by encrypting the third data (print data PD), the third data being based on the first data. In addition to the constituents of the editing device 120, the device obtained by combining the editing device 120 and the RIP processing device 130 includes a second key storage unit (key storage unit 132) configured to store the second private key Kb2 which is necessary for the encryption communication of the third data before starting the execution of the job (print job); a second communication unit (communication unit 31) configured to receive the job ID and the second data from the communication unit 21; a second job control unit (job control unit 134) configured to control whether the job is to be executed, based on the job ID received by the second communication unit; a second data decryption unit (print data decryption unit 135) configured to obtain the third data by decrypting the second data received by the second communication unit; a second data processing unit (RIP processing unit 34) configured to generate the fourth data based on the third data obtained by the second data decryption unit; and a second log encryption unit (log encryption unit 138) configured to encrypt a second log (log LGy) which shows the execution process of the job, using the public log key (third public key Ka3). The communication unit 21 receives the first data encrypted using the public key, the data decryption unit decrypts the encrypted first data received by the communication unit 21, using the private key, the data processing unit generates the second data by encrypting using the second public key, and the second data decryption unit decrypts the second data received by the second communication unit, using the second private key. The first data is data representing a material included in a printed matter, the second data is data obtained by encrypting data representing a page of the printed matter, and the fourth data is data processable by a printing machine.

According to the device obtained by combining the editing device 120 and the RIP processing device 130, by sending and receiving the first data and the second data by the encryption communication and controlling, based on the job ID, whether the job is to be executed, it is possible to prevent unauthorized use of the data generated during the execution of the job. Moreover, by encrypting the log and the second log using the public log key, it is possible to prevent altering of the log, and correctly trace the execution of the job. Moreover, by receiving the first data and sending and receiving the second data using the public key encryption scheme, it is possible to prevent unauthorized flow out of the first data and the second data in sending and receiving. Moreover, when generating the print data based on the manuscript data and generating the data processable by the printing machine based on the print data, the above-described effects can be attained. The device obtained by combining the editing device 120 and the RIP processing device 130 can be implemented by a computer which executes a program (editing/RIP processing program) having functions of an editing program and a RIP processing program.

(Sixth Embodiment)

Figure 16:
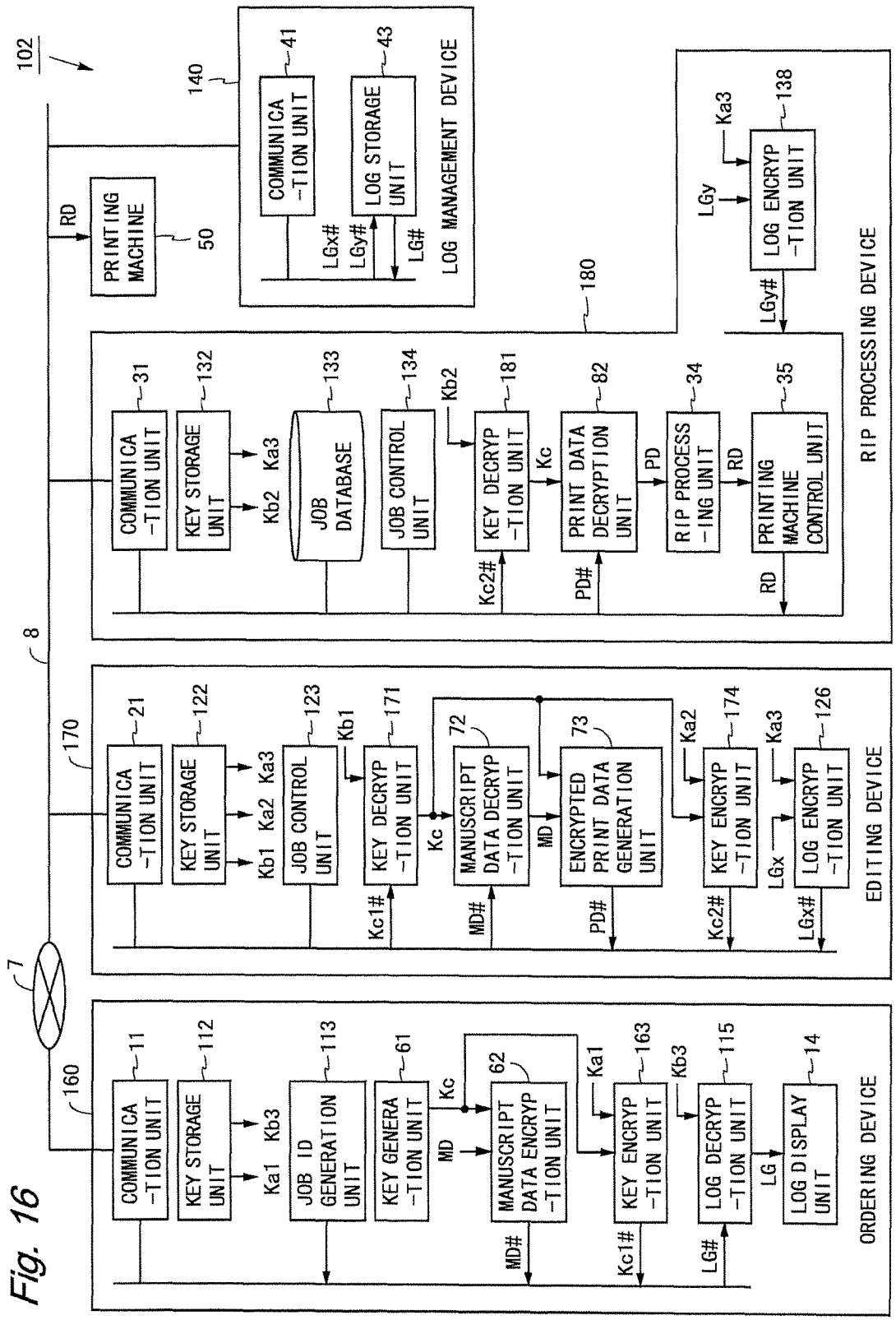
FIG. 16 is a block diagram showing details of a print system according to a sixth embodiment of the present invention.

FIG. 16 a block diagram showing details of a print system according to a sixth embodiment of the present invention. A print system 102 shown in FIG. 16 is obtained by replacing the ordering device 110, the editing device 120, and the RIP processing device 130 in the print system 101 according to the fifth embodiment with an ordering device 160, an editing device 170, and a RIP processing device 180, respectively. In the print system 102, as with the print system 2 according to the second embodiment, there is used a hybrid encryption scheme in which both the public key encryption scheme and the common key encryption scheme are used.

As shown in FIG. 16, the ordering device 160 is obtained by replacing the manuscript data encryption unit 114 in the ordering device 110 according to the fifth embodiment with the key generation unit 61, the manuscript data encryption unit 62, and a key encryption unit 163. The editing device 170 is obtained by replacing the manuscript data decryption unit 124 in the editing device 120 according to the fifth embodiment with a key decryption unit 171 and the manuscript data decryption unit 72, and replacing the encrypted print data generation unit 125 in the editing device 120 with the encrypted print data generation unit 73 and a key encryption unit 174. The RIP processing device 180 is obtained by replacing the print data decryption unit 135 in the RIP processing device 130 according to the fifth embodiment with a key decryption unit 181 and the print data decryption unit 82.

The key generation unit 61 generates the common key Kc. The manuscript data encryption unit 62 encrypts, using the common key Kc, the manuscript data MD managed in a secret state by the ordering device 160. The key encryption unit 163 encrypts the common key Kc using the first public key Ka1 stored in the key storage unit 112. The key decryption unit 171 decrypts the encrypted common key Kc1# received from the ordering device 160, using the first private key Kb1 stored in the key storage unit 122. The manuscript data decryption unit 72 decrypts the encrypted manuscript data MD# received from the ordering device 160, using the common key Kc obtained by the key decryption unit 171.

The encrypted print data generation unit 73 generates the encrypted print data PD# based on the manuscript data MD obtained by the manuscript data decryption unit 72, using the common key Kc. The key encryption unit 174 encrypts the common key Kc using the second public key Ka2 stored in the key storage unit 122. The key decryption unit 181 decrypts the encrypted common key Kc2# received from the editing device 170, using the second private key Kb2 stored in the key storage unit 132. The print data decryption unit 82 decrypts the encrypted print data PD# received from the editing device 170, using the common key Kc obtained by the key decryption unit 181. The RIP processing unit 34 and the printing machine control unit 35 operate in a manner similar to the first embodiment.

The job control units 123, 134, the log encryption units 126, 138, and the log decryption unit 115 operate in a manner similar to the fifth embodiment. The common key Kc obtained by the key decryption unit 171 and the common key Kc obtained by the key decryption unit 181 are deleted after finishing the printing.

Figure 17:
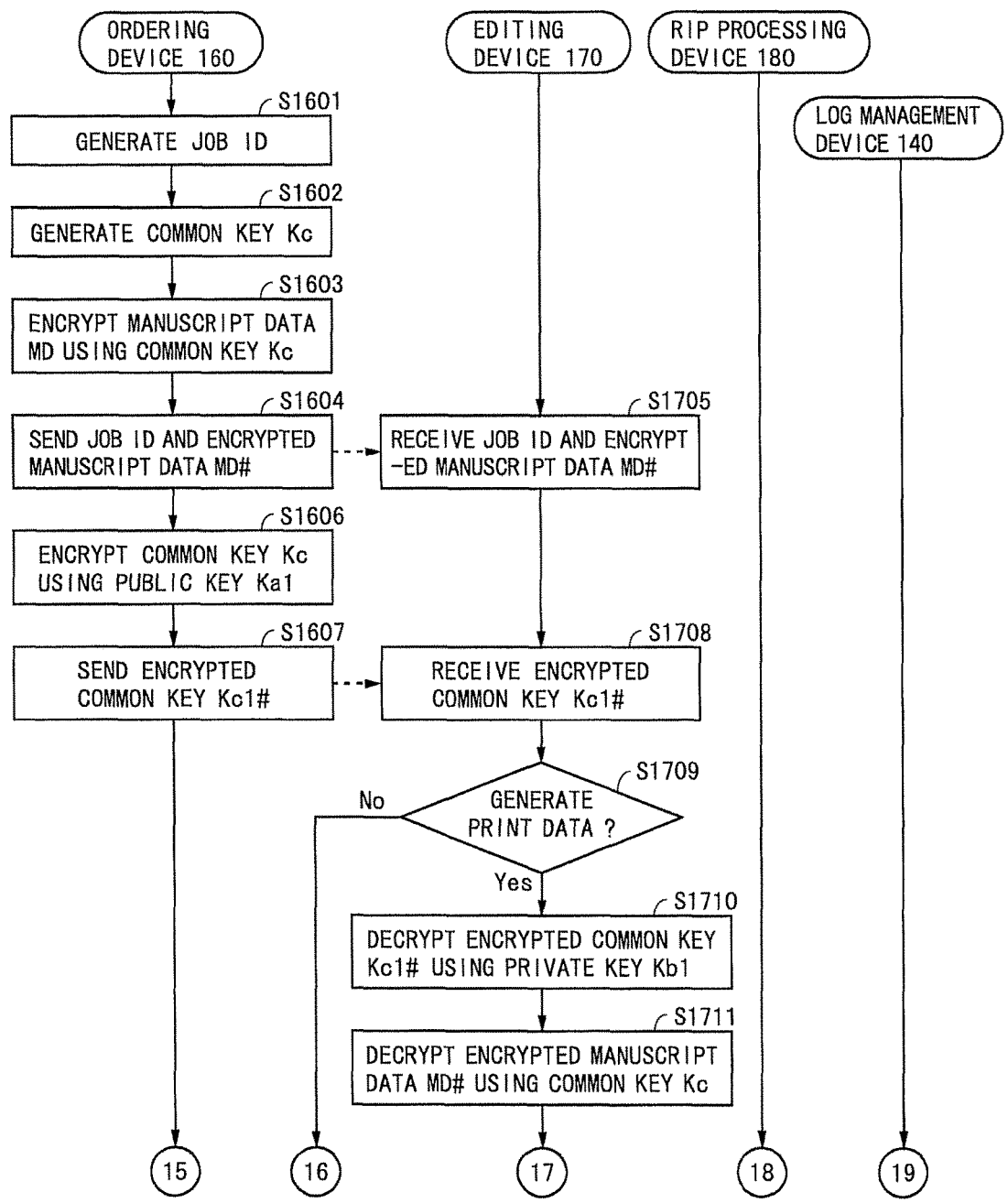
FIG. 17 is a flowchart showing operations of four computers which function as four devices included in the print system shown in FIG. 16.
Figure 18:
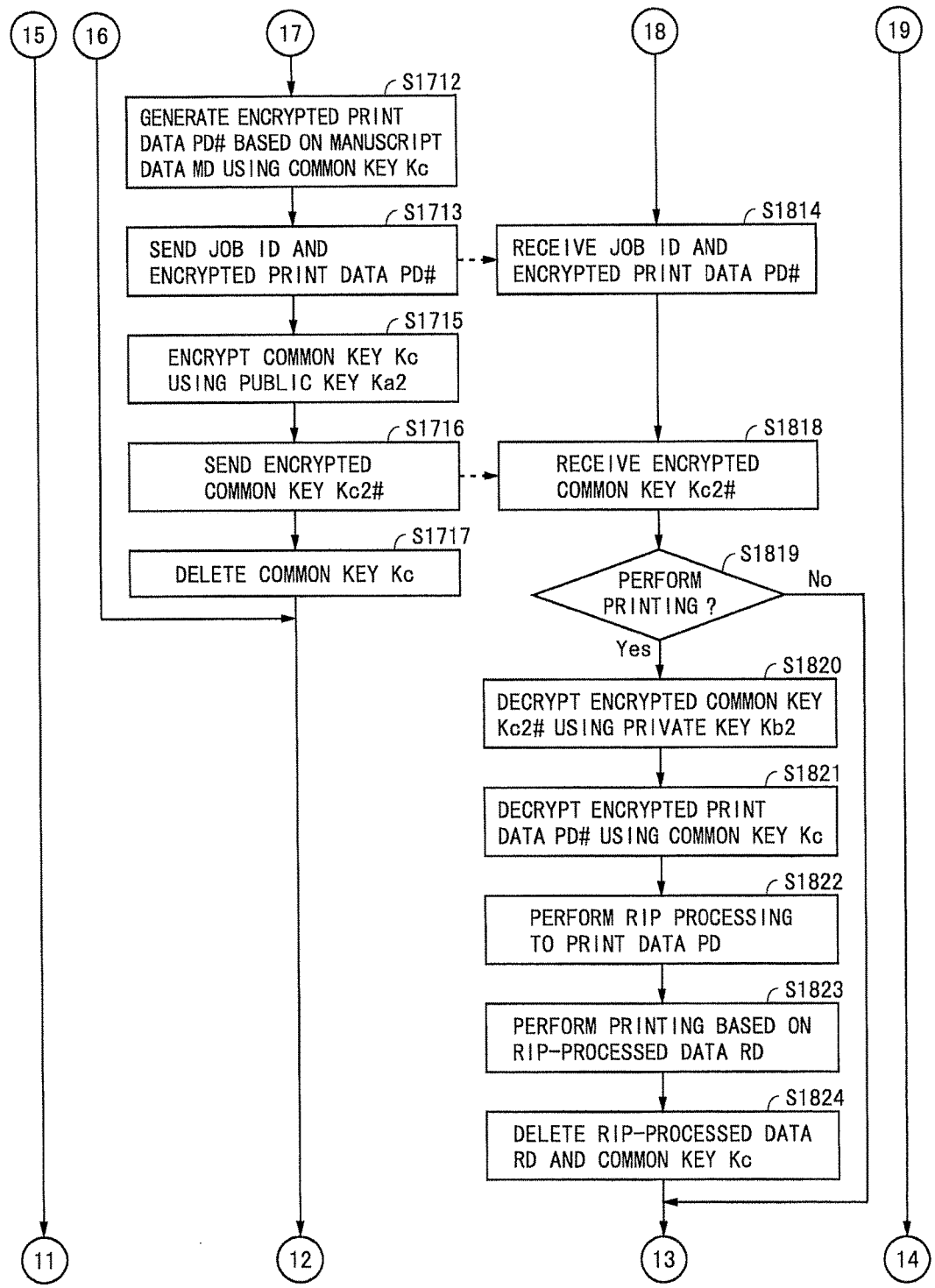
FIG. 18 is a flowchart continued from FIG. 17.

Each of the ordering device 160, the editing device 170, the RIP processing device 180, and the log management device 140 is typically implemented by a computer which executes a program. FIGS. 17 and 18 are flowcharts showing operations of four computers which function as the ordering device 160, the editing device 170, the RIP processing device 180, and the log management device 140.

In FIG. 17, the first CPU generates the job ID which is unique to the print job (step S1601). Next, the first CPU generates the common key Kc (step S1602). Next, the first CPU encrypts the manuscript data MD using the common key Kc (step S1603). Next, the first CPU sends the job ID and the encrypted manuscript data MD# to the editing device 170 (step S1604). The second CPU receives the job ID and the encrypted manuscript data MD# from the ordering device 160 (step S1705).

Next, the first CPU encrypts the common key Kc, using the first public key Ka1 stored in the key storage unit 112 (step S1606). Next, the first CPU sends the encrypted common key Kc1# to the editing device 170 (step S1607). The second CPU receives the encrypted common key Kc1# from the ordering device 160 (step S1708).

Next, the second CPU determines, based on the received job ID, whether the print data PD is to be generated (step S1709). In step S1709, a determination similar to that in step S1205 shown in FIG. 14 is performed based on the job ID received in step S1705. The second CPU goes to step S1710 when determining Yes, and goes to a step next to step S1717 when determining No.

In the former case, the second CPU decrypts the encrypted common key Kc1# received in step S1708, using the first private key Kb1 stored in the key storage unit 122 (step S1710). Next, the second CPU decrypts the encrypted manuscript data MD# received in step S1705, using the common key Kc obtained in step S1710 (step S1711). The manuscript data MD obtained in step S1711 is stored in the main memory 202, but is not stored in the storage unit 203.

In FIG. 18, next, the second CPU generates the encrypted print data PD# based on the manuscript data MD, using the common key Kc obtained in step S1710 (step S1712). In step S1712, the second CPU performs a processing of generating the print data PD based on the manuscript data MD and a processing of encrypting the generated print data PD using the common key Kc together and inseparably. The print data PD which is intermediate data is stored in the main memory 202, but is not stored in the storage unit 203. In step S1712, the second CPU releases storage area of the manuscript data MD and the print data PD in the main memory 202 after generating the encrypted print data PD#. Thus, the manuscript data MD and the print data PD are deleted in step S1712.

Next, the second CPU sends the job ID received in step S1705 and the encrypted print data PD#, to the RIP processing device 180 (step S1713). The third CPU receives the job ID and the encrypted print data PD# from the editing device 170 (step S1814). Next, the second CPU encrypts the common key Kc obtained in step S1710, using the second public key Ka2 stored in the key storage unit 122 (step S1715). Next, the second CPU sends the encrypted common key Kc2# to the RIP processing device 180 (step S1716). Next, the second CPU deletes the common key Kc obtained in step S1710 (step S1717).

The third CPU receives the encrypted common key Kc2# from the editing device 170 (step S1818). Next, the third CPU determines, based on the received job ID, whether the printing is to be performed (step S1819). In step S1819, a determination similar to that in step S1310 shown in FIG. 14 is performed based on the job ID received in step S1814. The third CPU goes to step S1820 when determining Yes, and goes to a step next to step S1824 when determining No.

In the former case, the third CPU decrypts the encrypted common key Kc2# received in step S1818, using the second private key Kb2 stored in the key storage unit 132 (step S1820). Next, the third CPU decrypts the encrypted print data PD# received in step S1814, using the common key Kc obtained in step S1820 (step S1821). Next, the third CPU performs the RIP processing to the print data PD, and thus obtains the RIP-processed data RD (step S1822). In step S1822, the third CPU deletes the print data PD after obtaining the RIP-processed data RD. Next, the third CPU performs printing based on the RIP-processed data RD (step S1823). Next, the third CPU deletes the RIP-processed data RD generated in step S1821 and the common key Kc obtained in step S1820 (step S1824).

The first to third CPUs perform the processing shown in FIG. 15, following to the processing shown in FIGS. 17 and 18. After executing step S1607, the first CPU executes steps S1123 and S1126 to S1128 shown in FIG. 15. After executing step S1709 or S1717, the second CPU executes steps S1215 to S1217 shown in FIG. 15. After executing step S1819 or S1824, the third CPU executes steps S1318 to S1320 shown in FIG. 15. The fourth CPU executes steps S1421, S1422, S1424 and S1425 shown in FIG. 15.

In the print system 102, the editing device 170 functions as a job execution device which performs a job execution method for generating second data (encrypted print data PD#) based on first data (manuscript data MD). The editing device 170 includes the communication unit 21, the key storage unit 122, the job control unit 123, a data decryption unit (manuscript data decryption unit 72), a data processing unit (encrypted print data generation unit 73), and the log encryption unit 126. The communication unit 21 receives the first data (encrypted manuscript data MD#) encrypted using the common key Kc, and the data decryption unit decrypts the encrypted first data received by the communication unit 21, using the common key Kc. The common key Kc is deleted after the execution of a job (print job). According to the editing device 170, by receiving the first data by using both the public key encryption scheme and the common key encryption scheme, it is possible to prevent unauthorized flow of the first data in receiving. Moreover, by encrypting and decrypting using the common key Kc, it is possible to perform these processing at high speed.

In the print system 102, the RIP processing device 180 also functions as a job execution device which performs a job execution method for generating second data (RIP-processed data RD) based on first data (print data PD). The RIP processing device 180 includes the communication unit 31, the key storage unit 132, the job control unit 134, a data decryption unit (print data decryption unit 82), a data processing unit (RIP processing unit 34), and the log encryption unit 138. The communication unit 31 receives the first data (encrypted print data PD#) encrypted using the common key Kc, the data decryption unit decrypts the encrypted first data received by the communication unit 31, using the common key Kc. The common key Kc is deleted after the execution of a job (print job). According to the RIP processing device 180, effects similar to those attained by the editing device 170 can be attained.

In the print system 102, the device obtained by combining the editing device 170 and the RIP processing device 180 functions as a job execution device which performs a job execution method for generating second data (encrypted print data PD#) based on first data (manuscript data MD) and further generating fourth data (RIP-processed data RD). The communication unit 21 receives the first data (encrypted manuscript data MD#) encrypted using the common key Kc, a data decryption unit (manuscript data decryption unit 72) decrypts the encrypted first data received by the communication unit 21, using the common key Kc, a data processing unit (encrypted print data generation unit 73) generates the second data by encrypting using the common key Kc, and a second data decryption unit (print data decryption unit 82) decrypts the second data received by a second communication unit (communication unit 31), using the common key Kc. The common key Kc is deleted after finishing the execution of a job (print job). According to the device obtained by combining the editing device 170 and the RIP processing device 180, by receiving the first data and sending and receiving the second data by using both the public key encryption scheme and the common key encryption scheme, it is possible to prevent unauthorized flow out of the first data and the second data in sending and receiving. Moreover, by encrypting and decrypting using the common key Kc, it is possible to perform these processing at high speed.

(Seventh Embodiment)

Figure 19:
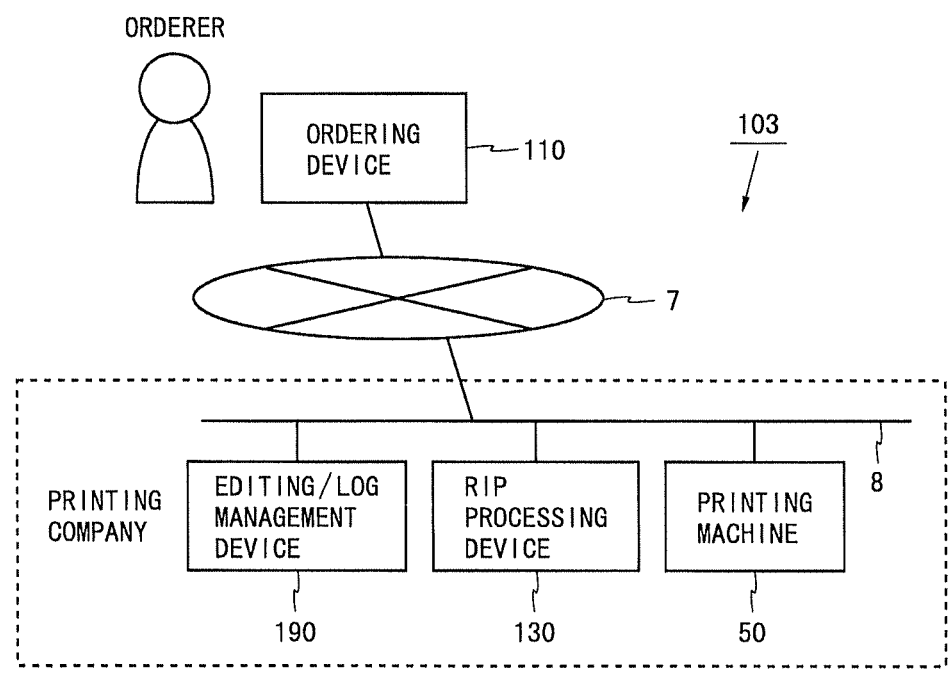
FIG. 19 is a block diagram showing details of a print system according to a seventh embodiment of the present invention.

FIG. 19 is a block diagram showing a configuration of a print system according to a seventh embodiment of the present invention. A print system 103 shown in FIG. 19 is obtained by replacing the editing device 120 and the log management device 140 in the print system 101 according to the fifth embodiment, with an editing/log management device 190. The editing/log management device 190 is obtained by adding functions of the log management device 140 to the editing device 120. The editing/log management device 190 is implemented by a computer which executes an editing program and a log management program. According to the print system 103, it is possible to reduce the number of devices (computers) included in the print system and reduce cost of the print system.

The print system 103 includes the editing/log management device 190 obtained by adding functions of the log management device 140 to the editing device 120. In place of this, the print system 103 may include a RIP processing/log management device obtained by adding functions of the log management device 140 to the RIP processing device 130. Moreover, functions of the log management device 140 may be added to the editing device 170 or the RIP processing device 180 according to the sixth embodiment.

(Eighth Embodiment)

Figure 20:
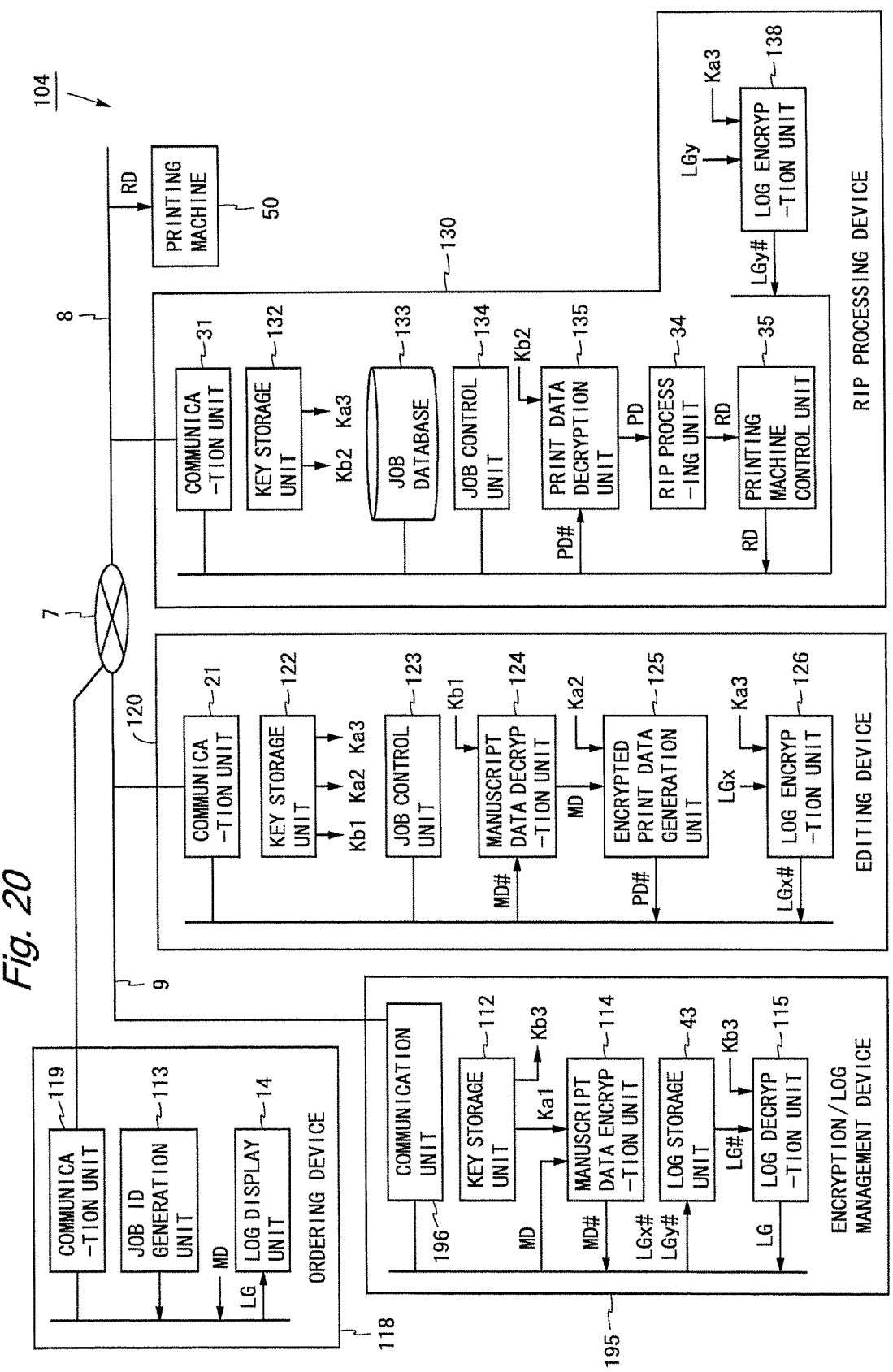
FIG. 20 is a block diagram showing details of a print system according to an eighth embodiment of the present invention.
Figure 21:
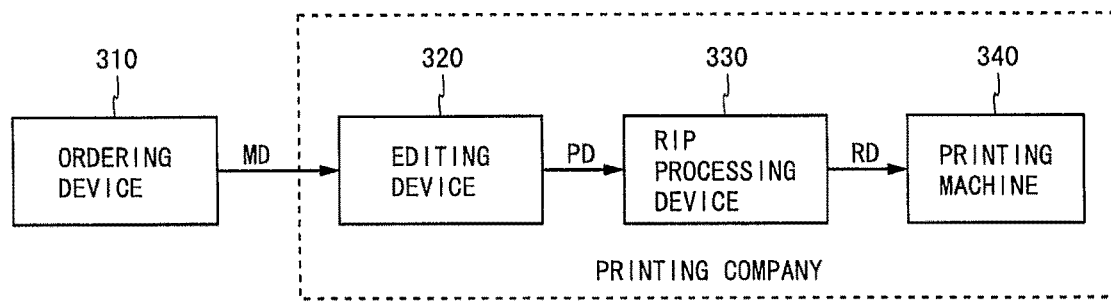
FIG. 21 is a diagram showing data flow in a print system.
Figure 22:
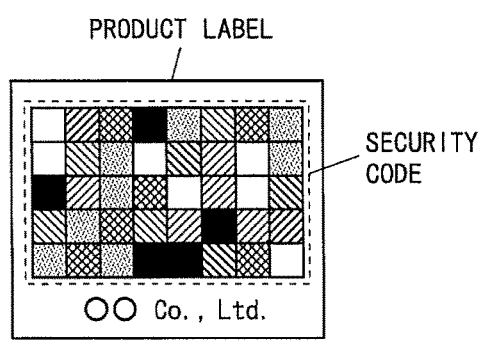
FIG. 22 is a diagram showing a product label on which a security code is printed.

FIG. 20 is a block diagram showing details of a print system according to an eighth embodiment of the present invention. A print system 104 shown in FIG. 20 is obtained by replacing the ordering device 15, the editing device 20, the RIP processing device 30, and the encryption/log management device 95 in the print system 4 (FIG. 11) according the fourth embodiment, with an ordering device 118, the editing device 120, the RIP processing device 130, and an encryption/log management device 195, respectively. The ordering device 118 includes a communication unit 119, the job ID generation unit 113, and the log display unit 14. The encryption/log management device 195 includes a communication unit 196, the key storage unit 112, the manuscript data encryption unit 114, the log storage unit 43, and the log decryption unit 115.

The ordering device 118 sends the manuscript data MD to the editing device 120 via the encryption/log management device 195. When sending the manuscript data MD from the ordering device 118 to the encryption/log management device 195, the encryption communication by the browser (an encryption communication provided by browser software which runs on a computer that constitutes the ordering device 118) is used. Communication using the public key encryption scheme is performed when sending the manuscript data MD from the encryption/log management device 195 to the editing device 120.

The editing device 120 and the RIP processing device 130 generate the logs LGx, LGy which show the execution process of printing, and write the logs to the log storage unit 43 in the encryption/log management device 195. The log LG is written to the log storage unit 43 in a state encrypted using the public key encryption scheme. The log decryption unit 115 decrypts the encrypted log LG# stored in the log storage unit 43. After finishing the printing, the ordering device 118 receives the log LG obtained by the log decryption unit 115, from the encryption/log management device 195, and displays the received log LG to a screen. When displaying the log LG to the screen, browser software which runs on a computer that constitutes the ordering device 118 is used.

The communication units 119, 21, 31, 196 send and receive data among the ordering device 118, the editing device 120, the RIP processing device 130, and the encryption/log management device 195. The communication units 119, 21, 31, 196 may be used for sending and receiving keys. The encryption communication by the browser is performed between the communication units 119, 196. The key storage units 112, 122, 132 store keys as with the fifth embodiment.

The manuscript data MD is sent from the ordering device 118 to the encryption/log management device 195. The encryption communication by the browser is used when sending the manuscript data MD. The manuscript data encryption unit 114 encrypts the manuscript data MD received from the ordering device 118, using the first public key Ka1 stored in the key storage unit 112. The encrypted manuscript data MD# is sent from the encryption/log management device 195 to the editing device 120. The manuscript data decryption unit 124 decrypts the encrypted manuscript data MD# received from the encryption/log management device 195, using the first private key Kb1 stored in the key storage unit 122. The job control units 123, 134, the encrypted print data generation unit 125, the print data decryption unit 135, the RIP processing unit 34, the printing machine control unit 35, and the log encryption units 126, 138 operate in a manner similar to the fifth embodiment.

The log LGx# encrypted by the log encryption unit 126 is sent from the editing device 120 to the encryption/log management device 195, and is written to the log storage unit 43. The log LGy# encrypted by the log encryption unit 138 is sent from the RIP processing device 130 to the encryption/log management device 195, and is written to the log storage unit 43. The log decryption unit 115 decrypts the encrypted log LG# stored in the log storage unit 43, using the third private key Kb3 stored in the key storage unit 112. The log LG obtained by the log decryption unit 115 is sent to the ordering device 118. The log display unit 14 displays, to the screen, the log LG received from the encryption/log management device 195.

In the print system 104, the encryption/log management device 195 encrypts, using the first public key Ka1, the manuscript data MD received from the ordering device 118, and decrypts, using the third private key Kb3, the log LG# stored in the log storage unit 43. When the manuscript data MD is sent from the ordering device 118 to the encryption/log management device 195, the encryption communication by the browser is performed. The ordering device 118 displays the log LG to the screen using the browser software. Therefore, according to the print system 104, it is possible to constitute the ordering device 118 only by adding software for generating the job ID to a computer managed by the orderer.

As for the print systems according to the fifth to eighth embodiments of the present invention, various types of variants can be formed. For example, in the print systems according to the fifth to eighth embodiments, the editing device and the RIP processing device are corresponded one-to-one. In a print system according to a variant, one editing device may be corresponded to a plurality of RIP processing devices, and the editing device may select one RIP processing device which performs the RIP processing from among the plurality of RIP processing devices in the execution of the print job. In this case, the key storage unit included in the editing device stores a plurality of second public keys before staring the execution of the print job, each of the second public key making a pair with a second private key which is uniquely determined for each RIP processing device. The print data PD is encrypted using a key selected from among the plurality of the second public keys stored in the key storage unit. Besides this, there can be considered a print system in which in the execution of the print job, the RIP processing device sends the second public key to the editing device, and the editing device encrypts the print data PD using the received second public key.

Moreover, in the print systems according to the fifth to eighth embodiments, the job ID is sent and received in the same step as the encrypted manuscript data MD# or the encrypted print data PD#. In a print system according to a variant, the job ID and the encrypted manuscript data MD# or the encrypted print data PD# may be sent and received in different steps separately. Moreover, in the print systems according to the fifth to eighth embodiments, the job ID is sent and received without being encrypted. In a print system according to a variant, the job ID is sent and received in a state encrypted by the same scheme as the manuscript data MD or the print data PD.

Moreover, in the print systems according to the fifth to eighth embodiments, the RIP processing device includes the job database 133. In a print system according to a variant, the editing device may include the job database 133. In this case, the job control unit included in the RIP processing device references the job database 133 by the communication between the editing device the RIP processing device, and determines, based on the result of the reference, whether the print data PD is to be generated.

Moreover, the print systems according to the fifth to eighth embodiments, both the editing device and the RIP processing device includes the job control unit. In a print system according to a variant, only the RIP processing device may include the job control unit. The job control unit in the editing device is not always necessary. That is, a job control based on a determination whether the print data PD is to be generated in the editing device is not always necessary. The reason for this is because it is sufficient to determine whether the printing is to be performed, based on the status of the job in the RIP processing device. However, in this case, the editing device generates the print data PD without making a determination based on the status of the job. This results in a demerit that in some cases, the RIP processing device later determines that printing based on the generated print data PD is not allowed, and as a result, generating the print data PD is a useless work.

Moreover, in the print systems according to the fifth to eighth embodiments, information concerning the print job stored in the job database 133 is retained without time limit. However, if it is desired to reduce capacity of the job database 133, the following variant can be applied. That is, a valid period of the job ID is limited by adding, to the job ID, information about generation date and time of the job ID or a valid time limit. And, when a predetermined time or a valid time period has passed after finishing execution of the print job, the job ID is invalidated and the RIP processing device 130 is set so that it determines that execution of the printing is not allowed. In this case, even if information concerning the print job which becomes old and goes outside the valid period is deleted from the job database 133, it is possible to prevent execution of unauthorized printing.

Note that in the above-described print systems, all of the ordering device, the editing device, the RIP processing device, the log management device, and the printing machine send and receive data and keys using communication network, such as a local area network or the Internet. However, in the print system of the present invention, the ordering device, the editing device, the RIP processing device, the log management device, and the printing machine may send and receive data or keys in off-line, without using the communication network. In this case, the communication unit sends the data or the keys by writing the data or the keys to an external storing medium, and receives the data or the keys by reading the data or the keys from the external storing medium.

Moreover, by combining features of the job execution method, the job execution device, and the recording medium on which the job execution program is recorded included in the above-described print systems, unless contrary to the nature thereof, it is possible to constitute a job execution method, a job execution device, and a recording medium on which a job execution program is recorded according to variants of the present invention.

As described above, according to the job execution method, the job execution device, and the recording medium on which the job execution program is recorded according to the present invention, it is possible to prevent unauthorized use of data generated during executing the job, and correctly trace the execution process of the job.

This application claims priority based on Japanese Patent Application No. 2016-70222 filed on Mar. 31, 2016 and entitled "Job Execution Device, Job Execution Method, and Job Execution Program", and Japanese Patent Application No. 2016-193068 filed on Sep. 30, 2016 and entitled "Job Execution Device, Job Execution Method, and Job Execution Program", which are incorporated herein by reference in their entirety.

What is claimed is:

1. A computer-implemented print job execution method for generating second data for performing printing based on first data in order to process a print job for an ordering device, the method comprising:
    generating a public key and a private key which are necessary for encryption communication of the first data;
    sending the public key and receiving encrypted first data;
    decrypting the received encrypted first data;
    generating the second data based on the decrypted first data;
    deleting at least the private key after finishing execution of the print job; and
    generating a log which shows an execution process of the print job, the log including information that the deleting has been executed;
    encrypting the log using a public log key; and
    sending the encrypted log to the ordering device in reply to a request from the ordering device.

2. The computer-implemented print job execution method according to claim 1, wherein the generating of the second data and a process of encrypting the second data are performed together and inseparably.

3. The computer-implemented print job execution method according to claim 2, wherein
    the first data is data representing a material included in a printed matter in a high security state, and
    the second data is print data based on the first data.

4. The computer-implemented print job execution method according to claim 2, wherein the first data is data representing a material included in a printed matter in a high security state, and
    the second data is RIP-processed data based on the first data.

5. A computer-implemented print job execution method for generating second data for performing printing based on first data in order to process a print job from an ordering device, the method comprising:
    storing a private key which is necessary for encryption communication of the first data, before starting execution of the print job;
    receiving a job ID being an identifier unique for the print job and encrypted first data;
    controlling whether the print job is to be executed, based on the received job ID;
    decrypting the received encrypted first data;
    generating, based on the controlling, the second data based on the decrypted first data;
    generating a log which shows an execution process of the print job, the log including a generating status of the second data;
    encrypting the log using a public log key; and
    sending the encrypted log to the ordering device in reply to a request from the ordering device.

6. The computer-implemented print job execution method according to claim 5, wherein the generating of the second data and a process of encrypting the second data are performed together and inseparably.

7. The computer-implemented print job execution method according to claim 5, wherein the controlling prevents the second data from being generated if the second data is already being generated or has been generated in connection with the received job ID.

8. The computer-implemented print job execution method according to claim 6, wherein
    the first data is data representing a material included in a printed matter in a high security state, and
    the second data is print data based on the first data.

9. The computer-implemented print job execution method according to claim 6, wherein the first data is data representing a material included in a printed matter in a high security state, and the second date is RIP-processed data based on the first data.

10. The computer-implemented print job execution method according to claim 5, further comprising deleting at least the private key after finishing execution of the print job.

11. A print job execution device for generating second data for performing printing based on first data in order to process a print job from an ordering device, the print job execution device comprising:
  a processor;
  a memory that stores a program and a private key which is necessary for encryption communication of the first data, before starting execution of the print job;
  a first interface circuit that receives a job ID being an identifier unique for the print job and encrypted first data;

wherein the program, when executed by the processor, causes the processor to perform:
    a job control operation that controls whether the print job is to be executed, based on the job ID received by the first interface circuit;
    a data decryption operation that decrypts the encrypted first data received by the first interface circuit;
    a data processing operation that generates, based on the job control operation, the second data based on the first data obtained by the data decryption operation; and
    a log encryption operation that (i) generates a log which shows an execution process of the print job, the log including a generating status of the second data by the data processing operation, and (ii) encrypts the log using a public log key; and
  a second interface circuit that sends the encrypted log to the ordering device in reply to a request from the ordering device.

* * * * *